US010782242B2

(12) United States Patent
Muhr et al.

(10) Patent No.: US 10,782,242 B2
(45) Date of Patent: Sep. 22, 2020

(54) INSPECTION METHOD FOR SEMICONDUCTOR SUBSTRATES USING SLOPE DATA AND INSPECTION APPARATUS

(71) Applicant: Infineon Technologies AG, Neubiberg (DE)

(72) Inventors: Robert Muhr, Villach (AT); Nicolas Siedl, Villach (AT)

(73) Assignee: Infineon Technologies AG, Neubiberg (DE)

( * ) Notice: Subject to any disclaimer, the term of this patent is extended or adjusted under 35 U.S.C. 154(b) by 6 days.

(21) Appl. No.: 16/213,793

(22) Filed: Dec. 7, 2018

(65) Prior Publication Data

US 2019/0178808 A1 Jun. 13, 2019

(30) Foreign Application Priority Data

Dec. 8, 2017 (DE) .......... 10 2017 129 356

(51) Int. Cl.
*G01N 21/00* (2006.01)
*G01N 21/88* (2006.01)
(Continued)

(52) U.S. Cl.
CPC ....... *G01N 21/8806* (2013.01); *G01B 11/306* (2013.01); *G01N 21/9503* (2013.01);
(Continued)

(58) Field of Classification Search
CPC .............. G01N 21/94; G01N 21/8806; G01N 21/9501; G01N 21/956; G01N 21/95607
(Continued)

(56) References Cited

U.S. PATENT DOCUMENTS 8,654,324 B2 2/2014 Gastaldo
2002/0122163 A1\* 9/2002 Inoue ............. G03B 27/52
355/55

(Continued)

FOREIGN PATENT DOCUMENTS

DE 102004031721 A1 1/2006
EP 2546599 A1 1/2013
(Continued)

OTHER PUBLICATIONS

Höfer, Sebastian, et al., "Infrared deflectometry for the inspection of diffusely specular surfaces", Advanced Optical Technologies 2016, vol. 5, Issue 5-6, pp. 377-387.
(Continued)

*Primary Examiner* — Md M Rahman
(74) *Attorney, Agent, or Firm* — Murphy, Bilak & Homiller, PLLC

(57) ABSTRACT

An inspection method for semiconductor substrates using slope data and corresponding inspection apparatus are provided. The inspection method includes recording, by using an inspection apparatus, first data from measuring points in an inspection area of a main surface of a semiconductor substrate. The inspection area winds around a center point of the main surface. The first data includes information about a slope of the main surface at the measuring points along a first direction that deviates from a direction tangential to a circle that contains the measuring point and that has its center in the center point by not more than ±60°. A data processing apparatus analyzes the first data to obtain position data of locations on the main surface, at which the first data fulfills predetermined criteria. The position data is output through a data interface unit.

22 Claims, 26 Drawing Sheets

(51) Int. Cl.
 *G01N 21/95* (2006.01)
 *G01B 11/30* (2006.01)
 *G06T 7/00* (2017.01)

(52) U.S. Cl.
 CPC ......... *G01N 21/9505* (2013.01); *G06T 7/001* (2013.01); *G01N 2021/8822* (2013.01); *G01N 2021/8829* (2013.01); *G01N 2021/8887* (2013.01); *G06T 2207/30148* (2013.01)

(58) Field of Classification Search
 USPC ..................................................... 356/237.5
 See application file for complete search history.

(56) References Cited

U.S. PATENT DOCUMENTS

| | | | | |
|---|---|---|---|---|
| 2004/0016930 A1* | 1/2004 | Yoshida | ................. | H01L 22/32 257/79 |
| 2008/0225303 A1 | 9/2008 | Lampalzer | | |
| 2010/0073687 A1* | 3/2010 | Spalding | ............ | G01B 11/2425 356/625 |
| 2012/0287424 A1* | 11/2012 | Hori | .......................... | G03F 1/84 356/237.1 |
| 2013/0319071 A1* | 12/2013 | Vodnick | ................... | G01N 3/02 73/1.08 |
| 2015/0018622 A1* | 1/2015 | Tesar | ...................... | A61B 1/05 600/202 |

FOREIGN PATENT DOCUMENTS

| | | |
|---|---|---|
| EP | 2140252 B1 | 11/2018 |
| WO | 2011098324 A1 | 8/2011 |

OTHER PUBLICATIONS

Merklinger, Harold M., "Principles of View Camera Focus", May 1996, Accessed online at http://www.trenholm.org/hmmerk/VuCamTxt.pdf on Dec. 7, 2018.

* cited by examiner

FIG 8A
FIG 8B
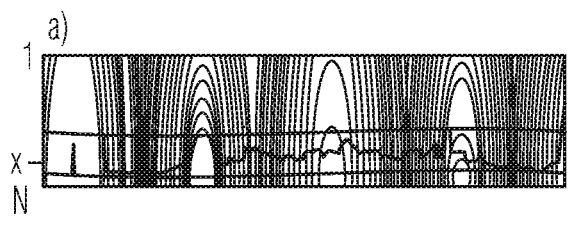
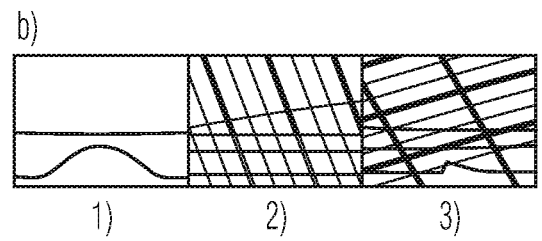

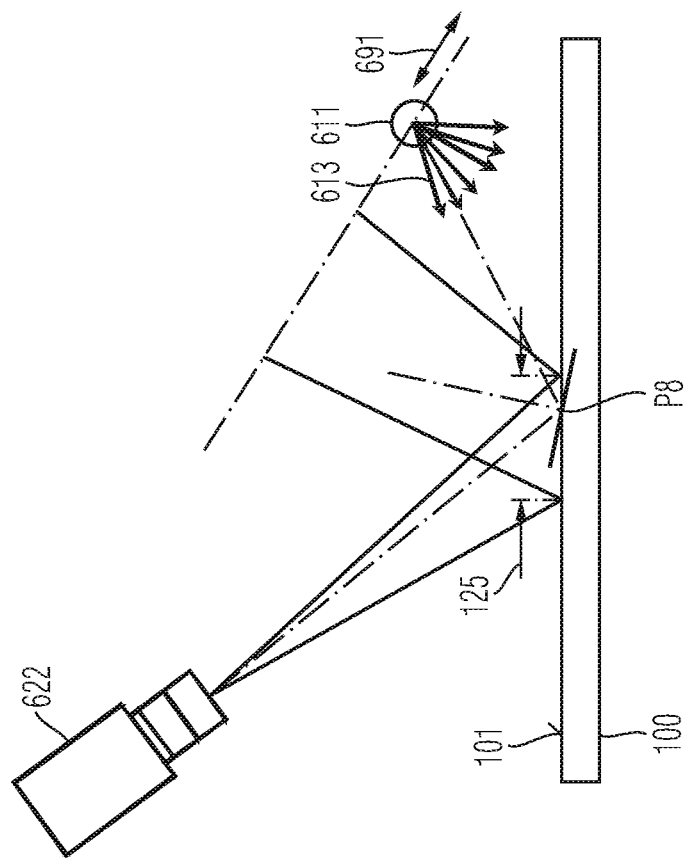
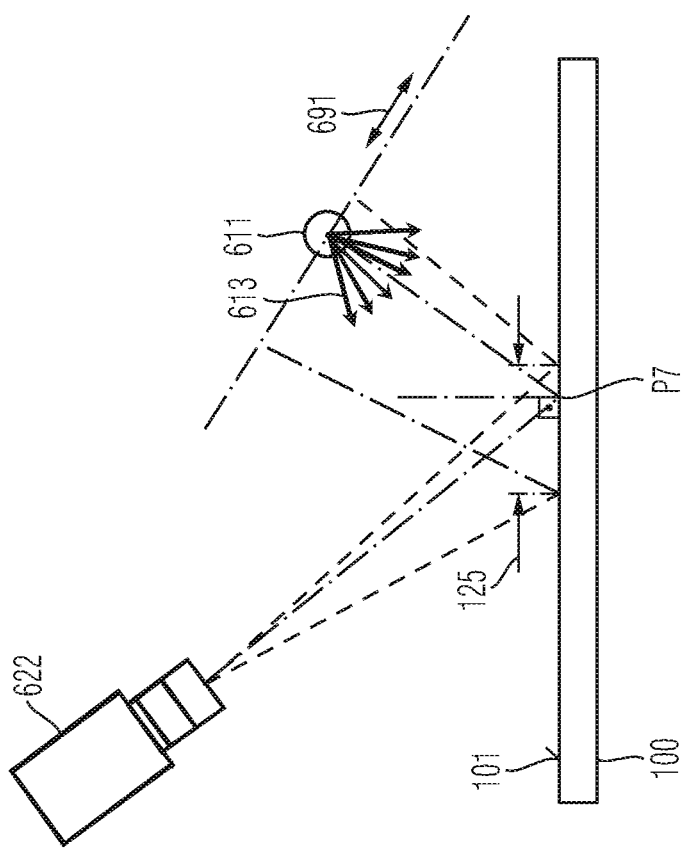

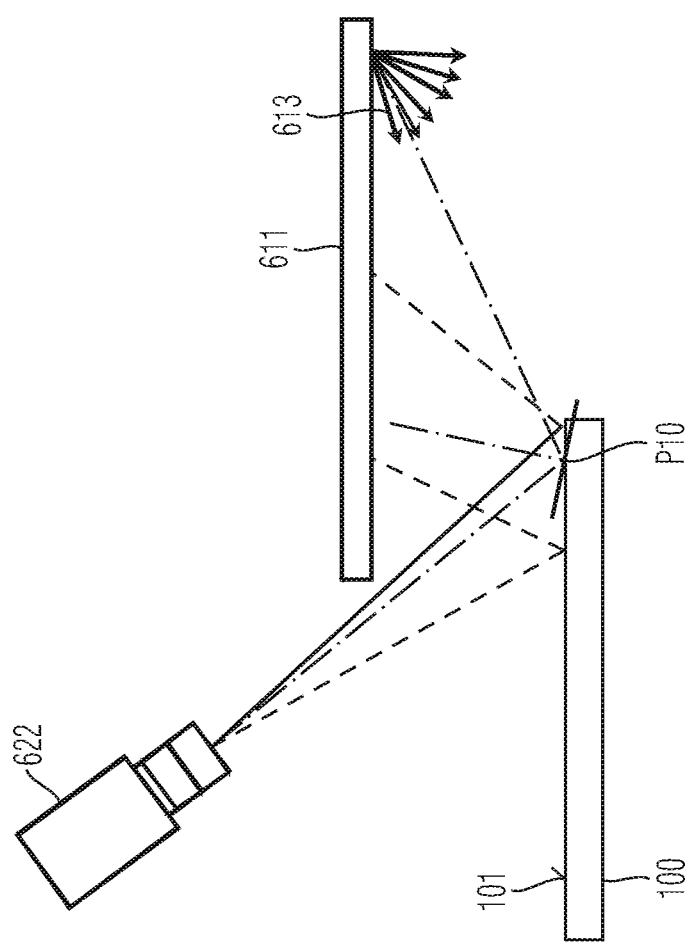
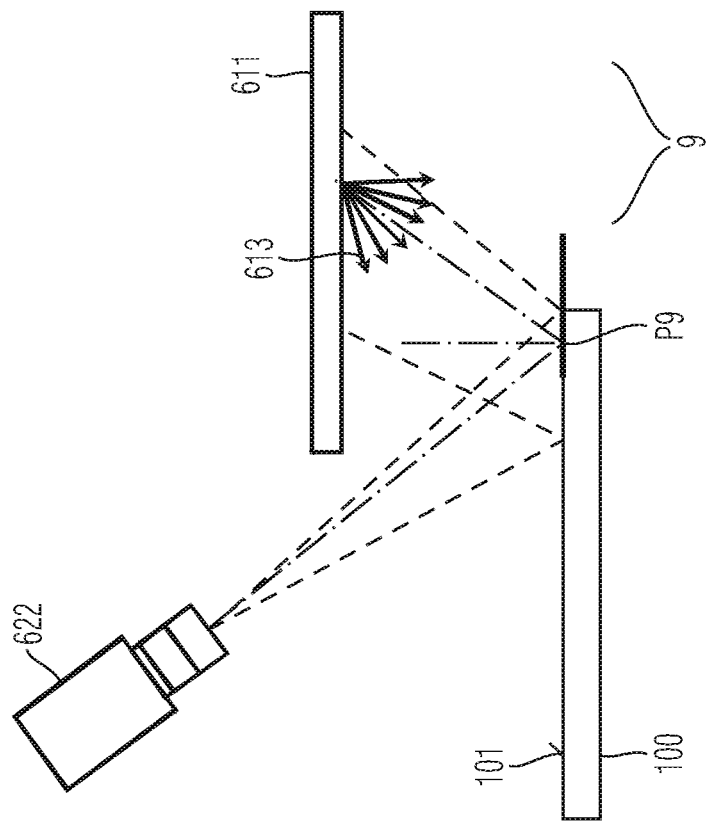
FIG 10F
FIG 10G

INSPECTION METHOD FOR SEMICONDUCTOR SUBSTRATES USING SLOPE DATA AND INSPECTION APPARATUS

TECHNICAL FIELD

The present disclosure concerns the inspection of semiconductor substrates such as semiconductor wafers for the manufacture of integrated circuits and power semiconductor devices, wherein contactless methods are used for the detection of structural defects such as hairline cracks and edge fractures.

BACKGROUND

The miniaturization of semiconductor devices is attended by the reduction of the thickness of the semiconductor devices and thinned semiconductor wafers from which the semiconductor devices are obtained. With decreasing thickness, the semiconductor wafers get more prone to mechanical damages and electric test methods applicable to the semiconductor wafer become more delicate. The wide variety of surface structure and composition of finalized semiconductor wafers as well as the typically undefined edge exclusion area along the wafer edge typically impede reliable detection of structural defects by automatized optical inspection methods, which have gained some importance in the field of particle detection on wafer surfaces. Up to now an optical check for structural defects such as hairline cracks on processed and patterned semiconductor wafers typically involves manual inspection.

The present disclosure aims at automated inspection methods and inspections apparatuses for detecting structural defects in semiconductor substrates with high reliability.

SUMMARY

The present disclosure is related to an inspection method for semiconductor substrates. By using an inspection apparatus, first data are obtained from measuring points in an inspection area of a main surface of a semiconductor substrate, wherein the inspection area winds around a center point of the main surface and wherein the first data includes information about a slope of the main surface along a first direction at the respective measuring point. The first direction is a tangential direction to a circle around the center point and through the measuring point or deviates from the tangential direction by not more than ±60°. A data processing apparatus processes the first data to obtain position data of such locations on the main surface, at which the first data fulfils a predetermined criterion. A data interface unit outputs at least the position data.

The semiconductor substrate may be a semiconductor wafer, for example a silicon wafer with a diameter of 200 mm or 300 mm at an arbitrary stage of wafer fabrication, e.g., after a process that thins the semiconductor substrate to a final thickness or prior to dicing, i.e., before separating semiconductor dies from the semiconductor substrate. The main surface of the semiconductor substrate is the exposed one of two substantially horizontal and parallel base surfaces.

The inspection area is a portion of the main surface selected for inspection. The inspections area may be spaced from the center point and may be a circular annulus confined by two concentric circles having different radii, or may be a polygonal annulus confined by two different concentric regular polygons with different maximum diameter. Alternatively, the inspection area may be a spiral-shaped area with at least one complete turn around the center point or may include more than one annulus.

For detecting hairline cracks the inspection area may directly adjoin an outer edge of the main surface or may be at least close to the outer edge. The inspection area may include or may not include the edge exclusion area.

During the inspection the semiconductor substrate may be arranged on a substrate carrier, for example, a dicing tape and the inspection area may include a section of the dicing tape as well.

The information about a slope of the main surface with reference to a horizontal reference plane is referred to as slope information in the following. The slope information concerns the slope of the main surface at the measuring points and for each measuring point along a certain direction which is referred to as "first direction" in the following.

With reference to a radial coordinate system the first direction may be the direction tangential to a circle that contains the respective measuring point and that has its center in a center point on the main surface or a direction that deviates by not more than ±60° e.g., by not more than ±7.5° from the respective tangential direction. The first direction denominates not one single direction in a plane but marks for each measurement point the direction along which the slope is evaluated. In an orthogonal reference plane, the "first direction" of the measuring points may point in different directions.

The "first direction" defined for measuring points on the same radial line to the center point may point in the same direction. For some approaches the "first direction" is the same for groups of measuring points in a same inspection field.

The first data includes the above defined slope information for the measurement points in the inspection area and is referred to as slope data in the following. The slope data may be divided into line data sets, wherein each line data set includes the slope information of measuring points along one inspection line around the center point of the semiconductor substrate. The inspection lines may run parallel to the boundary lines of the inspection area.

For example, the slope data includes the slope information for measuring points on closed inspection lines around the center point and for each measuring point in a direction tangential to the inspection line. The inspection lines within an annular inspection area may be circles of different diameters and the inspection lines within a polygonal annulus around the center point may be polygonal lines.

The inspection apparatus may be any apparatus adapted to obtain data that contains the slope information. The inspection apparatus may include an optical measuring device capable of recording data containing the slope information, wherein the recorded data may directly represent the slope data or wherein the recorded data may be preliminary data from which the slope data can be derived by data processing. For example, the recorded data contains topography data containing information of a height or depth of the main surface at the measurement points with respect to a horizontal reference plane.

The inspection apparatus may include a CWL (chromatic white light) sensor, a white light interferometer, a laser stripe sensor, a photometric stereo apparatus or a deflectometry apparatus. Recorded topography data may be converted into slope data, wherein the slope information is obtained by knowledge about the height of the measuring points and the distance between the measuring points along the first direction. Analyzing the first data may also include further data processing such as digital filtering for suppressing noise, parasitic effects and outlayers.

A data processing apparatus may evaluate the slope data. For example, the data processing apparatus searches along each inspection line for certain criteria, checks for consistency of the criteria in neighboring inspection lines and obtains position data of locations on the main surface, where the slope information fulfils predetermined criteria.

The data interface unit outputs inspection data that includes at least the position data. The inspection data may include further data such as bright field images and dark field images that may contain further information for defect classification and for estimating the impact of the detected defects on the concerned portion of the semiconductor substrate.

The method makes use of the observation that certain structural defects of a semiconductor substrate, e.g., hairline cracks, show a typical signature in a specific subset of the overall slope data which can be reliably separated from the signatures of use patterns, non-critical artefacts and even from the strongly varying signatures of edge exclusion areas.

According to an embodiment second data is obtained from the first data, wherein the second data is descriptive for a change of slope along the respective first direction and wherein the position data is obtained for locations of the main surface at which the second data exceeds a predetermined threshold.

Close to the substrate edge hairline cracks typically propagate from the outer edge in predominantly radial direction. It could be shown that evaluating the slope data along a line that intersects the hairline crack more or less orthogonally, e.g., along the inspection lines described above, results in a specific signature in the second data. In other words, the inspection method records and evaluates selectively a specific sort of slope data that contains significant information about typical structural defects.

According to an embodiment, the first data includes information about a slope of the main surface at the measuring points along the direction tangential to a circle around the center point and through the respective measuring point. In other words, the first data includes profile information along circular inspection lines that intersect the radial direction in all sections of the inspection area orthogonally such that the recorded first data provides strong signals in the second data for the most frequent type of hairline cracks.

According to an embodiment, the inspection apparatus records topography data and processing the first data includes converting the topography data into slope data, wherein the slope information is obtained by knowledge about the height of the measuring points and the distance along the first direction. Converting the topography data into the slope data may also include a digital filtering for suppressing noise, parasitic effects and outlayers.

According to another embodiment, the inspection apparatus includes a deflectometry apparatus that directly records the slope information along the first direction and that directly outputs slope data. The deflectometry apparatus may include a slid-shaped radiation source and a detection device, wherein the radiation source and the detection device are arranged such that the detection device receives a radial projection of the radiation emitted by the radiation source and reflected from the semiconductor substrate in the inspection area.

The radiation source may emit infrared radiation, ultraviolet radiation and/or visible light, wherein the radiation source has at least a longitudinal extension, along which the emission characteristic, e.g., the radiation cone is approximately uniform. The radiation source may be, e.g., a straight heated wire. According to another embodiment the radiation source includes a flat emission surface and a slit-shaped aperture. The radiation emitted through the aperture is also referred to as "light emitting line" in the following, irrespective of the wavelength of the emitted radiation.

According to an embodiment, a longitudinal axis of the light emitting line is parallel to the main surface and orthogonal to a direct connection line between the radiation source and the detection device. According to another embodiment, a longitudinal axis of the light emitting line is in a plane orthogonal to the main surface and through the direct connection line between the radiation source and the detection device.

The deflectometry apparatus may be arranged to record the slope data along polygonal inspection lines. For example, the first data includes a number n of data subsets and each data subset contains, for measuring points in one of n area sections of the inspection area, the slope information about an slope of the main surface at the measuring point in a direction that is orthogonal to exactly one radial line from the area section to the center point. The number n denotes a natural number greater than 2, for example 24. The radial line determining the direction along which the slope is recorded for the complete area section may intersect the center of the respective area section.

According to this embodiment, evaluation of the slope data includes evaluating the profile along regular polygonal inspection lines around the center point. Also, polygonal inspection lines intersect typical hairline cracks at angles close to 90° and allow the direct recording of slope data by using a linear movement of the radiation source along a direction orthogonal to the propagation direction of the radiation and in this way combine high sensitivity to hairline cracks with a comparatively simple deflectometry apparatus.

For example, the light emitting line is oriented parallel to the main surface of the semiconductor substrate and with the longitudinal axis orthogonal to a direct connection line between the radiation source and the detection device. By moving the radiation source along a substantially tangential direction with respect to the center point, the detection device can obtain the slope at the measuring points from evaluating the position of the reflected intensity maximum. Compared to usual deflectometry methods used for semiconductor substrates, which use light patterns instead of a single light emitting line and which capture slope information along more than one direction, the deflectometry method according to this embodiment uses a simpler setting that records and evaluates only a portion of the overall slope information.

According to a further embodiment, the semiconductor substrate is arranged on a carrier surface of a substrate carrier, for example a dicing tape and the inspection area extends beyond the lateral outer surface of the semiconductor substrate. In this embodiment, the first data includes not only information about the slope at measuring points on the main surface of the semiconductor substrate but also information in a section of the carrier surface of the substrate laterally directly adjoining the semiconductor substrate such that critical defects in the substrate carrier, for example, cracks or folds in a dicing tape can be detected.

According to a further embodiment, further auxiliary data is recorded in addition to the slope data. For example the auxiliary data includes intensity data of radiation emitted by an auxiliary radiation source and reflected at or passing through the main surface. The auxiliary data may be used in combination with the first data to obtain the position data of locations on the main surface at which the first data fulfils predetermined criteria. For example, the auxiliary data may include information about a use patterns on the semiconductor substrate and the process of determining the position data uses the auxiliary data to selectively filter out a bias related to the use pattern in the slope data.

The present disclosure also refers to an inspection apparatus that includes a support device adapted to temporarily fix a DUT that includes at least a semiconductor substrate. A measuring device records first data from measuring points in an inspection field of a DUT surface of a DUT that can be arranged on the support device, wherein the first data includes information about a slope of the DUT surface at the measuring points along a direction tangential to a circle that contains the respective measuring point and that has its center in a center point of the DUT. A positioning device facilitates a rotational relative movement between the measuring device and the support device. A control device is signal connected with the positioning device and controls a relative movement between the measuring device and the support device such that the inspection field moves around the center point.

The present disclosure further relates to a deflectometry apparatus that includes a radiation source adapted to define a light emitting line. A detection assembly includes a support device adapted for temporarily fixing a DUT that includes at least a semiconductor substrate. A detection device detects radiation emitted by the radiation source and reflected at a DUT surface of a DUT that can be arranged on the support device. A positioning device is mechanically coupled to at least one of the radiation source and the detection assembly and facilitates a relative movement between the light emitting line and the detection assembly.

Those skilled in the art will recognize additional features and advantages upon reading the following detailed description, and upon viewing the accompanying drawings.

BRIEF DESCRIPTION OF THE DRAWINGS

The accompanying drawings are included to provide a further understanding of the embodiments and are incorporated in and constitute a part of this specification. The drawings illustrate the embodiments of the present disclosure and together with the description serve to explain principles of the embodiments. Other embodiments and intended advantages will be readily appreciated as they become better understood by reference to the following detailed description.

FIGS. 8A and 8B show images of an inspection area of a DUT for discussing background useful for understanding of the embodiments.

FIG. 10C is a schematic side view of the embodiment of FIG. 10B in a first position of the light emitting line for discussing details of the light emitting line.

FIG. 10D is a schematic side view of the embodiment of FIG. 10B in a second position of the light emitting line.

FIG. 10F is a schematic side view of the embodiment of FIG. 10E in a first position of the light emitting line for discussing details of the light emitting line.

FIG. 10G is a schematic side view of the embodiment of FIG. 10E in a second position of the light emitting line.

DETAILED DESCRIPTION

In the following detailed description, reference is made to the accompanying drawings, which form a part hereof and in which are shown by way of illustrations specific embodiments in which the embodiments may be practiced. It is to be understood that other embodiments may be utilized and structural or logical changes may be made without departing from the scope of the present disclosure. For example, features illustrated or described for one embodiment can be used on or in conjunction with other embodiments to yield yet a further embodiment. It is intended that the present disclosure includes such modifications and variations. The examples are described using specific language, which should not be construed as limiting the scope of the appending claims. The drawings are not scaled and are for illustrative purposes only. Corresponding elements are designated by the same reference signs in the different drawings if not stated otherwise.

The terms "having", "containing", "including", "comprising" and the like are open and the terms indicate the presence of stated structures, elements or features but not preclude the presence of additional elements or features. The articles "a", "an" and "the" are intended to include the plural as well as the singular, unless the context clearly indicates otherwise.

Figure 1A:
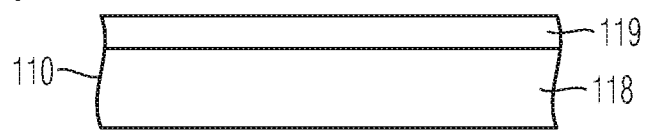
FIG. 1A is a schematic cross-sectional view of a portion of a semiconductor substrate for discussing background useful for understanding of the embodiments.
Figure 1B:
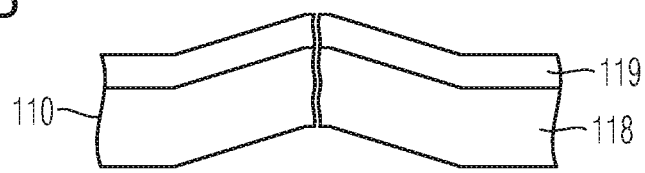
FIG. 1B is a schematic cross-sectional view of a portion of a semiconductor substrate with a hairline crack for discussing background useful for understanding of the embodiments.
Figure 1C:
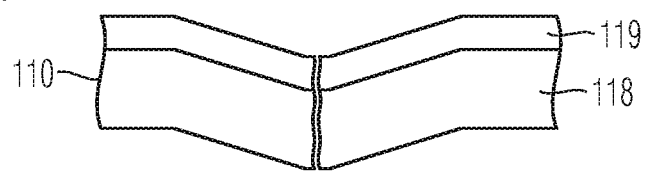
FIG. 1C is a schematic cross-sectional view of a portion of a semiconductor substrate with another hairline crack for discussing background useful for understanding of the embodiments.

FIGS. 1A to 1C show semiconductor substrates 110 which may partially be or be finalized semiconductor wafers prior to dicing, i.e., prior to the separation of single semiconductor dies from the semiconductor substrate 110.

The semiconductor substrate 110 may include several horizontally layered layers or layer stacks, for example a support layer 118 and a surface layer 119 formed on the support layer 118, wherein each of the surface layer 119 and the support layer 118 may include one or more homogeneous or patterned layers. A material composition of the support layer 118 differs from that of the surface layer 119 such that a mismatch between physical properties of the surface layer 119 and the support layer 118, e.g., different thermal expansion coefficients or different lattice constants, may induce mechanical strain in the semiconductor substrate 110.

In FIG. 1B the surface layer 119 exerts tensile stress. When a hairline crack forms in the semiconductor substrate 110, the tensile stress forms a local bulge at the front side of the semiconductor substrate 110 on both sides of the hairline crack.

In FIG. 1C the surface layer 119 exerts a compressive strain. When a hairline crack forms in the semiconductor substrate 110, the compressive stress forms a local bulge at the back side of the semiconductor substrate 110 on both sides of the hairline crack.

In both cases the local bulge formed prior to the formation of the hairline crack 954 persists. On both sides of the hairline crack the bulge effects a significant change of the slope in a direction perpendicular to the hairline crack. The inspection methods and inspection systems described in the following make use of the distinctive sort of wafer deformation typically accompanying the formation of mechanical defects such as hairline cracks.

FIGS. 2A to 2D illustrate physical properties of an edge section of a semiconductor substrate 110 including an edge fracture 952 along an outer surface 113 of a semiconductor substrate 110 and a hairline crack 954 spreading from the edge fracture 952 into the inner portion of the semiconductor substrate 110, wherein the propagation direction depends on the crystal type of the semiconductor substrate 110.

Figure 2A:
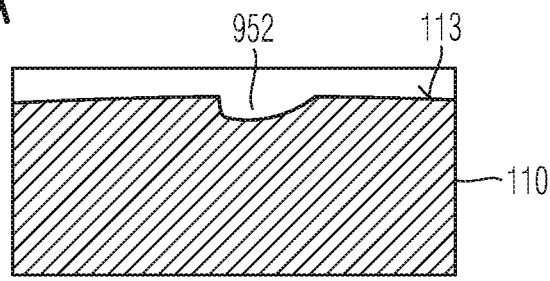
FIG. 2A schematically illustrates an intensity image of an edge section of a semiconductor substrate including an edge fracture under backlight illumination for discussing background useful for understanding of the embodiments.

FIG. 2A schematically shows a backlight image of the edge section taken under backlight illumination, wherein a light detector at the front side of the semiconductor substrate 110 records an intensity image of light emitted by a light source irradiating the rear side of the semiconductor substrate 110. The backlight image does not show more than the edge fracture 952.

Figure 2B:
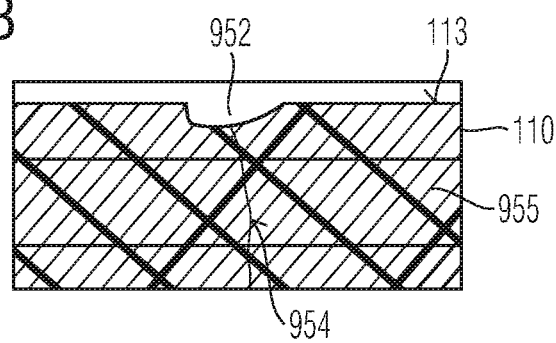
FIG. 2B schematically illustrates the substrate edge section of FIG. 2A under chromatic white light illumination.

FIG. 2B schematically shows an intensity image detected by a chromatic white line sensor for the same edge section. The chromatic white line sensor receives chromatically dispersed white line reflected at the front side of the semiconductor substrate 110. In the chromatic white light, a use pattern at the front side is visible, which may include patterned surface layers and a buried structure, for example, trench structures extending from the front side into the semiconductor substrate 110 and filled with a material which index of refraction differs from that of the surrounding material. Though the hairline crack 954 appears perceivable the optical signal from the hairline crack 954 is weak compared to the signal from the use pattern 955. In the intensity image, the hairline crack 954 is not reliably detectable.

Figure 2C:
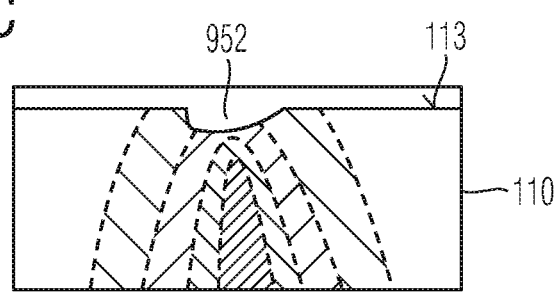
FIG. 2C schematically illustrates topography data recorded from the substrate edge section of FIG. 2A.

In FIG. 2C the hatched areas reflect height data obtained, for example, by using the chromatic white line sensor used for FIG. 2B. The denser the hatching lines in a hatched area are, the greater is the deviation of the local height from a horizontal reference plane.

Though the height data may point to irregularities in the concerned section of the wafer surface, the height data does not necessarily identify a critical defect such as a hairline crack, because the inspected wafer surface may be a structured surface including a use pattern with steps.

Figure 2D:
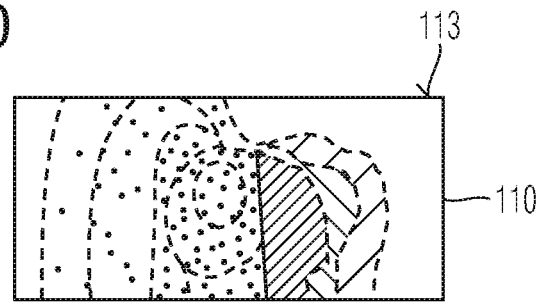
FIG. 2D schematically illustrates slope data recorded from the substrate edge section of FIG. 2A.

FIG. 2D illustrates the slope along a direction substantially perpendicular to the radial direction. The line-hatched areas indicate a negative slope, wherein the slope is the higher, the denser the hatching lines are. The dotted areas indicate a positive slope, wherein the higher the amount of positive slope the higher the dot density is. The significant change of the slope along the line separating the dotted areas from the line-hatched areas provides strong evidence for the presence of a hairline crack along the same line.

The inspection method is based on recording and analyzing slope data in a consistent direction relative to the edge of the wafer. A direction parallel to the substrate rim, in other words the tangential direction to the edge of the semiconductor substrate is the direction that is best suitable for the slope measurement in order to detect hairline cracks.

Figure 3:
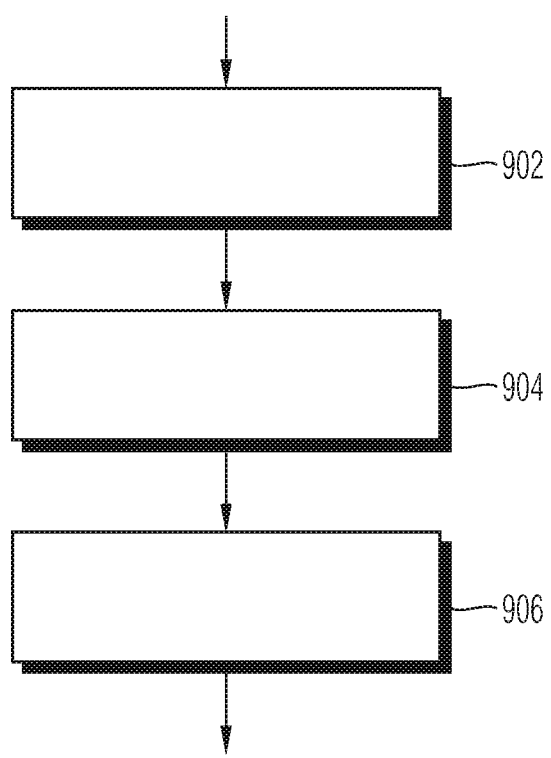
FIG. 3 is a simplified flowchart for illustrating an inspection method for a semiconductor substrate according to an embodiment.

FIG. 3 refers to an inspection method using the distinctive change in selected slope data in the presence of hairline cracks as illustrated in FIG. 2D for an effective automated inspection strategy.

By using an inspection apparatus first data is obtained from measuring points in an inspection area of a main surface of a semiconductor substrate (902). The inspection area extends around a center point of the main surface. The first data includes information descriptive for the slope of the main surface at the measuring points along a first direction that for the respective measuring point deviates from a direction tangential to a circle that contains the respective measuring point and that has its center in a center point by not more than ±60°. A data processing apparatus analyses the first data to obtain position data of locations on the main surface at which the first data fulfils predetermined criteria (904). A data interface unit outputs the position data (906).

Recording the first data gets along with a contactless, optical inspection at the front side such that the method can be applied to semiconductor substrates mounted on substrate carriers, e.g., dicing tapes. The inspection method is also applicable to the rear side of semiconductor substrates with or without substrate carrier.

Due to the selective recording of slope data in a specific direction the method can handle a large amount of different wafer technologies, a huge variety of use patterns, material combinations. The method can handle semiconductor substrates with differently defined surface roughness and is comparatively insensitive to variations within the edge exclusion area and allows an automated inspection approach.

The method avoids subjectivity and labor intensity of macroscopic and microscopic manual inspection of the edge of semiconductor substrates with regard to hairline cracks. The method facilitates inspection of the complete outer rim of the semiconductor substrate while electric testing targets only active chips i.e., only a portion of the outer rim.

Compared to conventional phase measuring deflectometry (PMD) that captures data from the whole main surface with one camera at the same time, for embodiments with one detection device the inspection method according to the embodiments successively scans a comparatively small inspection area along the rim of the semiconductor substrate and therefore facilitates a higher resolution and detection of hairline cracks even on patterned surfaces and on comparatively rough surfaces.

FIGS. 4A to 4D illustrate the inspection method by reference to an annular inspection area 120, a height profile 171 along a circular inspection line 181 within the annular inspection area 120 and a schematic slope profile 172 along the circular inspection line 181.

Figure 4A:
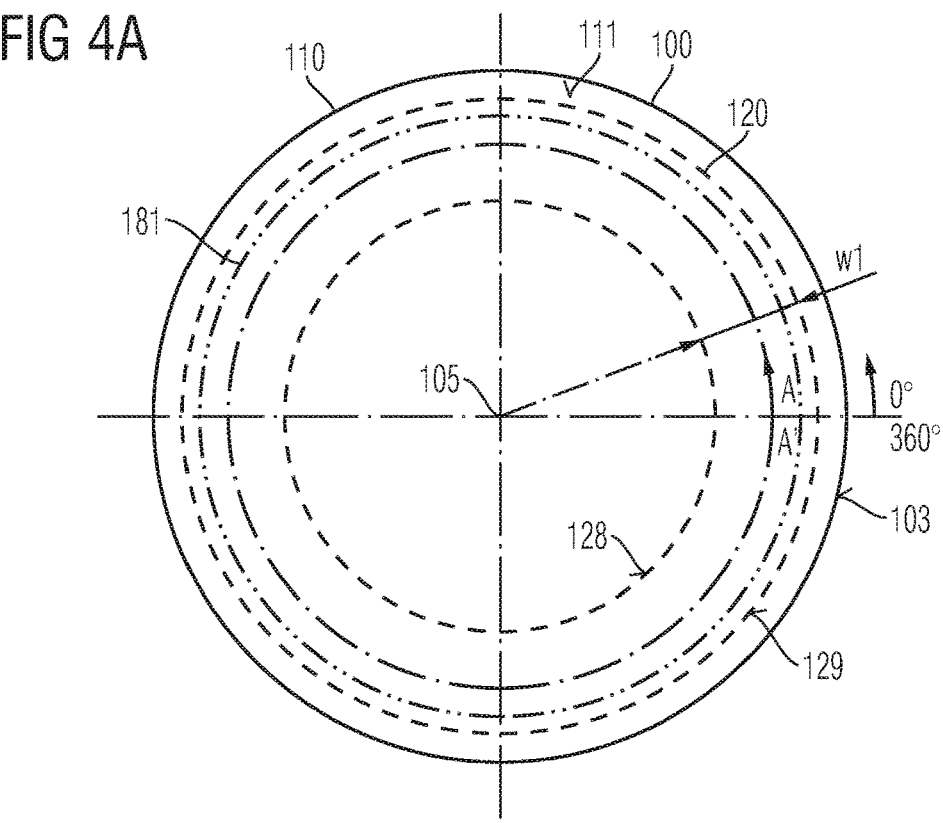
FIG. 4A is a schematic plan view of a main surface of a semiconductor substrate for describing an inspection method according to an embodiment obtaining and evaluating slope data along a circular inspection line in an annular inspection area.

FIG. 4A shows a DUT (device under test) 100 that includes at least a semiconductor substrate 110. The semiconductor substrate 110 may be a silicon wafer, a germanium wafer, an SiGe wafer, a silicon carbide wafer or a wafer based on an $A_{III}B_V$ compound semiconductor, for example, a GaN or GaAs wafer, an SOG (silicon on glass) wafer or an SOI (silicon on insulator) wafer at an arbitrary stage of processing. The semiconductor substrate 110 may be a circular disc with a center point 105, wherein the semiconductor substrate 110 may have a notch or a flat along an outer surface 113. The semiconductor substrate 110 may be a standard wafer, e.g., a standard wafer with a diameter of 200 mm and a thickness of 725 µm, a standard wafer with a diameter of 300 mm and a thickness of 775 µm, or may be a wafer with a standard diameter but with a thickness less than 700 µm, for example, less than 200 µm.

An inspection apparatus records first data containing slope information for a main surface 111 at the exposed surface, e.g., a main surface at the front side of the semiconductor substrate 110 at measuring points within an annular inspection area 120, wherein for each measuring point the slope information may give the slope along the tangential direction, i.e., the direction tangential to a circle around the center point 105 and through the respective measuring point.

The inspection apparatus may record the slope information along a number of circular inspection lines between an inner boundary line 128 and an outer boundary line 129 of the annular inspection area 120. A width w1 of the inspection area 120 may be in a range from 500 μm to 60 mm, e.g., in a range from 4 mm to 40 mm. According to another embodiment the width w1 may correspond to the extension of the field of view of a single sensitive unit. The inspection apparatus may include a measuring device based on a radiation sensor with a number m of sensitive units arranged along a line that is oriented parallel to the radial direction at a distance to each other that determines the radial resolution of the inspection apparatus. Each sensitive unit may include a plurality of subunits arranged orthogonal to the line of m sensitive units. Each sensitive unit may record the height data along a circular inspection line 181. The number m of sensitive units may be in a range from 10 to 1000, by way of example.

Figure 4B:
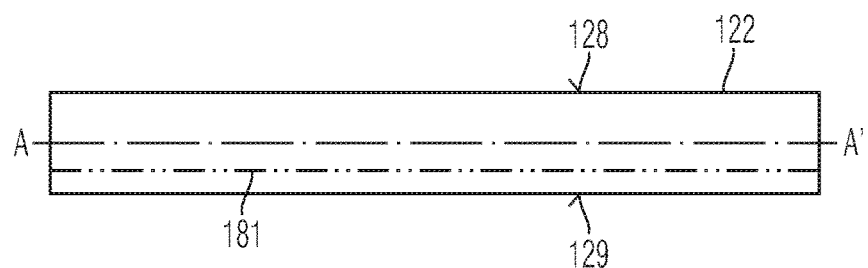
FIG. 4B shows a transformation of the annular inspection area of FIG. 4A into a linear stripe.

FIG. 4B unrolls the annular inspection area 120 of FIG. 4A along the tangential direction between point A and point A', wherein in the unrolled inspection area 122, the length of the circular inspection lines is normalized to the length of one of the circular inspection lines. Along the inner boundary line 128 of the annular inspection area 120 the distance between neighboring measuring points is smaller than along the outer boundary line 129.

Figure 4C:
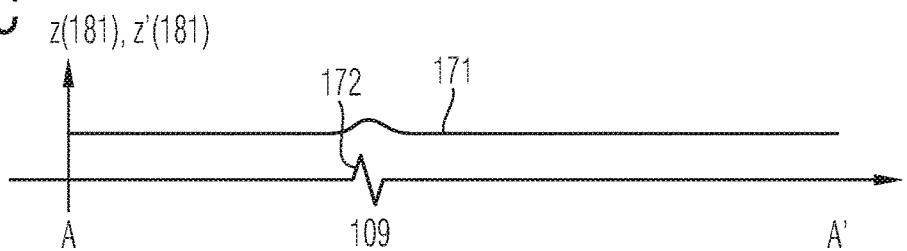
FIG. 4C shows a schematic height profile along a circular inspection line within the inspection area of FIG. 4A.

FIG. 4C shows a height profile 171 indicating the height z of the main surface 111 with respect to a horizontal reference plane along the circular inspection line 181 for a hypothetical semiconductor substrate 110 with a hairline crack that extends inwardly at least up to the position of the circular inspection line 181. The height profile 171 includes a cross-section through a bulge as illustrated in FIG. 1B.

A slope profile 172 for the same circular inspection line 181 indicates the slope z' that changes from a positive value to a negative value within a comparatively narrow distance. The slope profile 172 may be derived from the height profile 171 or may be directly recorded from the main surface 111, e.g., by using a deflectometry apparatus.

From the slope profile 172 of FIG. 4C a data processing apparatus may derive data that indicates the change of the slope along the circular inspection line 181.

Figure 4D:
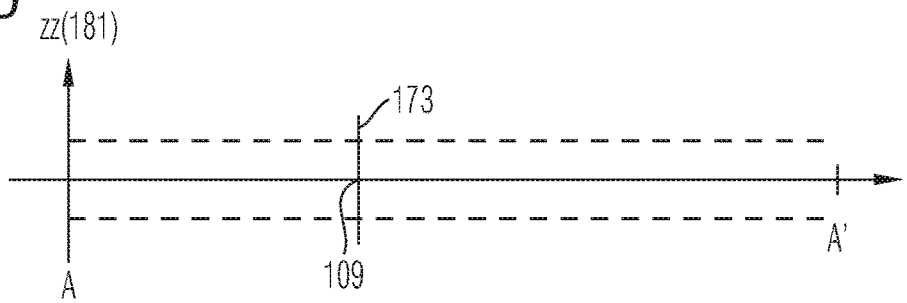
FIG. 4D shows a diagram schematically illustrating a slope data along the inspection line of FIG. 4C.

Line 173 in FIG. 4D illustrates the change zz of the slope. At a position 109 line 173 shows a strong peak exceeding both a positive and a negative threshold value. Further analysis of the change-of-slope data may compare the results obtained for neighboring circular inspection lines to decide whether the signal illustrated in FIG. 4D shows an outlayer or is part of a line with a minimum length extension of 1 mm or more.

In case the evaluation points to a hairline crack at a position 109 the method proceeds with generating position data identifying the position 109 with reference to a notch, flat or mark on the semiconductor substrate 110 and outputting the position data.

Alternatively or in addition to the circular inspection lines of FIG. 4A other embodiments may scan the main surface 111 along non-circular inspection lines.

Figure 5:
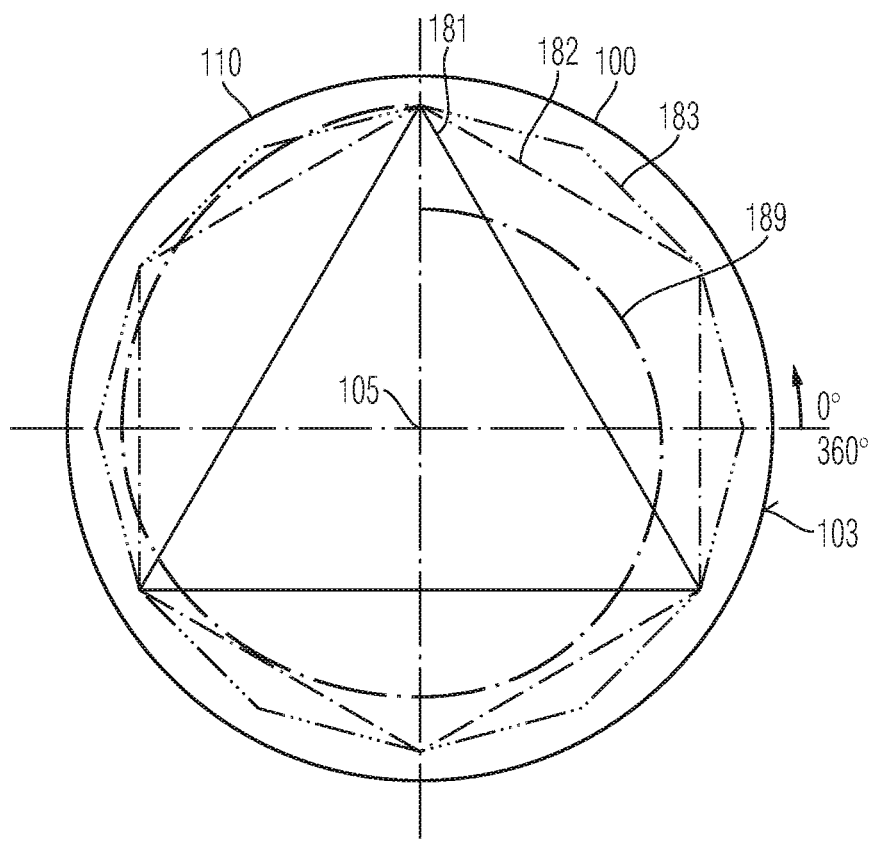
FIG. 5 is a schematic plan view of a main surface of a semiconductor substrate for illustrating inspection lines according to other embodiments.

FIG. 5 shows polygonal inspection lines 182, 183, 184 obtained for inspection areas with regular polygonal inner boundary line and regular polygonal outer boundary line. Polygonal inspection lines may be the result from a method that uses a deflectometry apparatus with a light emitting line moved along a linear trajectory for the inspection of a segment of the inspection area. Inspection line 189 is a spiral with one winding around the center point 105.

Figure 6A:
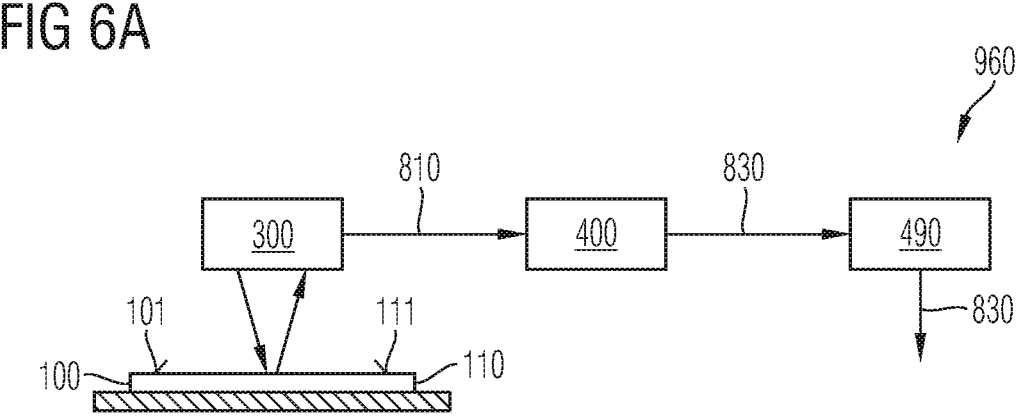
FIG. 6A is a schematic block diagram of an inspection system according to an embodiment.

FIG. 6A shows an embodiment of an inspection system 960 for carrying out the above described inspection method.

An inspection apparatus 300, for example, an optical inspection apparatus, records first data 810 from an inspection area 120 of a DUT surface 101 of DUT 100 including at least a semiconductor substrate 110 along a first direction. The first data 810 may be topography data or slope data. The inspection apparatus 300 transmits the first data 810 to a data processing apparatus 400 that evaluates the received first data 810 and that outputs position data 830 indicative for such positions on the main surface 111 at which the slope data points to a structural defect. A data interface unit 490 outputs the position data 830. The data interface unit 490 may be a user interface, for example a monitor visualizing the position data 830 or may be a data transmission interface for feeding the position information into a data system.

Figure 6B:
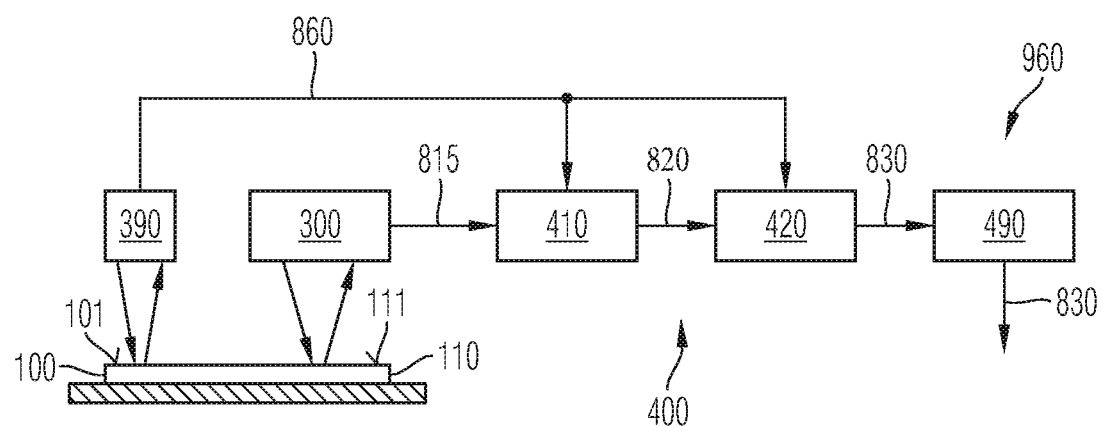
FIG. 6B is a schematic block diagram of an inspection system according to an embodiment with an auxiliary inspection device.

FIG. 6B refers to details of an embodiment of an inspection system 960 that includes an inspection apparatus 300 outputting topography data 815. A first functional block 410 of the data processing apparatus 400 may transform the topography data 815 into second data 820 that represents the slope data and by analyzing the second data 820 a second functional block 420 obtains the position data 830.

An auxiliary inspection device 390 may record auxiliary data 860 from the inspection area 120 and may transmit the auxiliary data 860 to the first and/or second functional block 410, 420 of the data processing apparatus 400. The functional blocks 410, 420 may use the auxiliary data 860 to filter out critical information from the topography data 815 and/or the second data 820, for example, information linked to a use pattern on a specific type of semiconductor substrate 110.

Figure 7A:
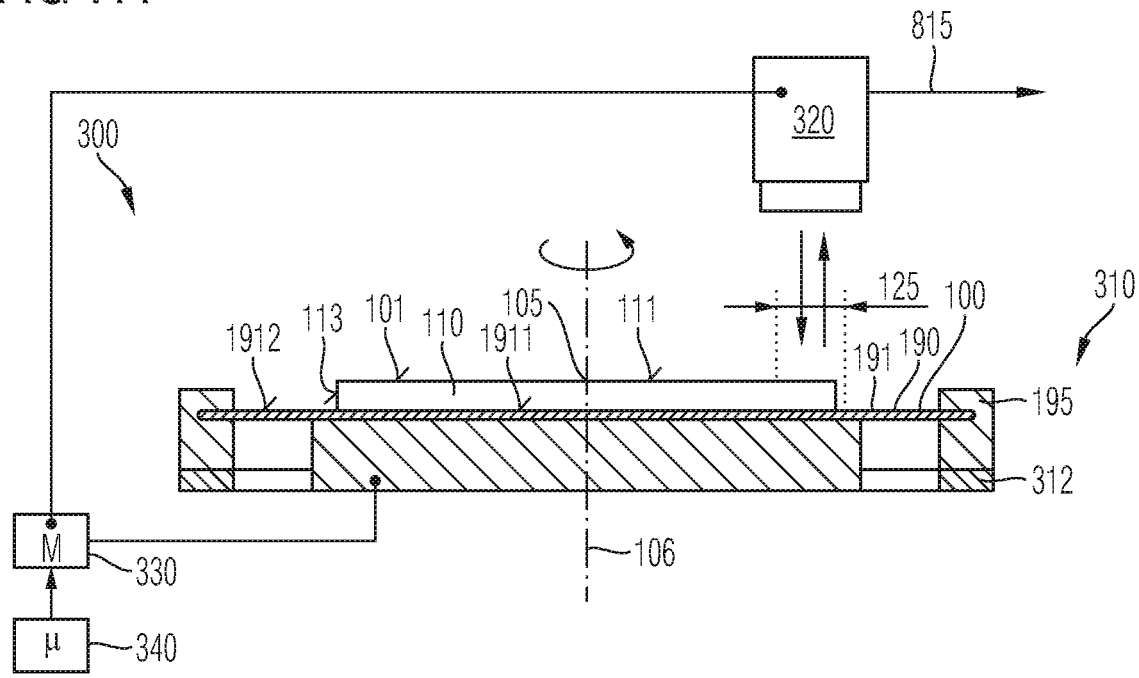
FIG. 7A is a schematic block diagram of an inspection apparatus according to an embodiment with a measuring device recording topography data.

FIG. 7A shows an inspection apparatus 300 for a DUT 100 including a semiconductor substrate 110 arranged on a substrate carrier 190. The substrate carrier 190 may be a dicing tape or sawing foil that stabilizes the semiconductor substrate 110 during a process that separates single semiconductor dies from the semiconductor substrate 110. The semiconductor substrate 110 is arranged on a first surface section 1911 of the substrate carrier 190 and an exposed second surface section 1912 of the substrate carrier 190 laterally surrounds the semiconductor substrate 110. A circular frame 195 may clamp the substrate carrier 190.

The inspection apparatus 300 includes a support device 312 for temporarily fixing the DUT 100. For example, the support device 312 may include a chuck on which the DUT 100 rests.

A measuring device 320 arranged above the support device 312 obtains first data from measuring points in an inspection field 125 of a DUT surface 101 of a DUT 100 that is temporarily arranged on and fixed by the support device 312. For example, the measuring device 320 records topography data 815 that inherently includes information about an slope of the DUT surface 101 at measuring points along a direction tangential to a circle that contains the respective measuring point and that has its center in a center point 105 of the DUT 100.

The measuring device 320 may be movable with respect to the support device 312 or the support device 312 may be movable with respect to the measuring device 320. A positioning device 330 is mechanically connected, e.g., force-locked connected with at least one of the measuring device 320 and the support device 312 and facilitates a rotational relative movement between the measuring device 320 and the support device 312. A control device 340 controls the positioning device 330 such that the inspection field 125 moves along a circular track around the center point 105. The circular track defines an annular inspection area on the DUT surface 101 and the topography data 815 includes the height profiles along circular inspection lines. From the height difference between successively obtained height values along the same inspection line and from a distance of the inspection line to the center point 105 slope data can be obtained that is descriptive for the slope of the DUT surface 101 in tangential direction.

Figure 7B:
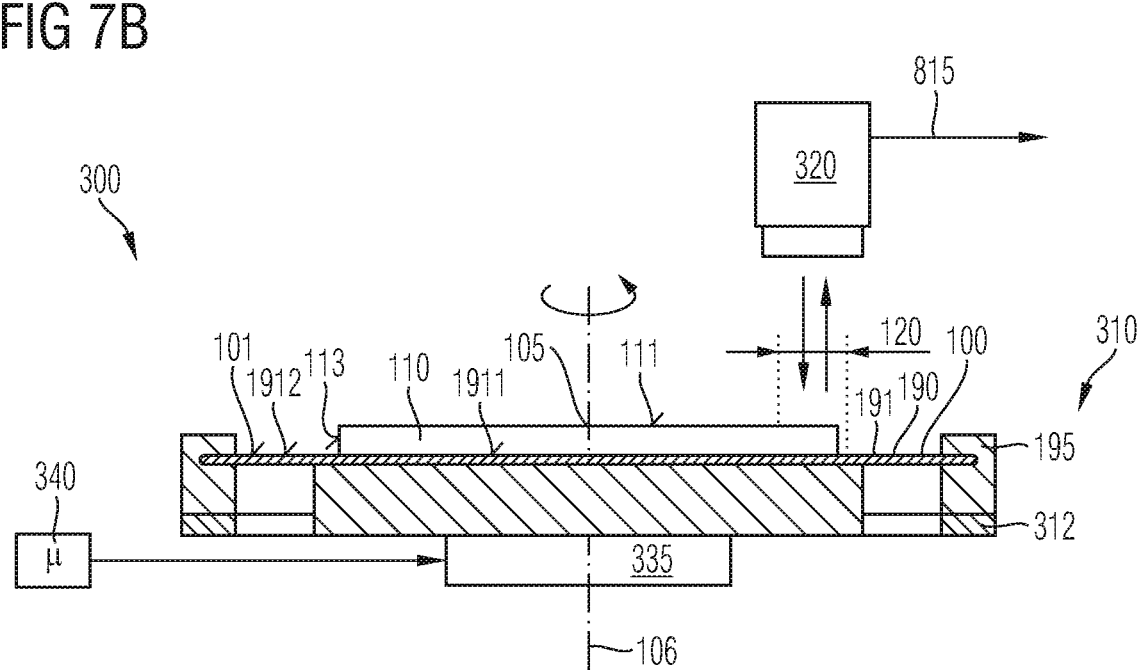
FIG. 7B is a schematic block diagram of an inspection apparatus according to an embodiment with a rotational motor drive for a support device.

In FIG. 7B the positioning device 330 includes a rotational motor drive 335 that is mechanically connected with the support device 312 and signal connected with the control device 340. The rotational motor drive 335 may rotate the support device 312 with the DUT 100 fixed upon around a rotational axis 106 through the center point 105 and orthogonal to the DUT surface 101. The measuring device 320 records height profiles for circular inspection lines around the center point 105.

Figure 7C:
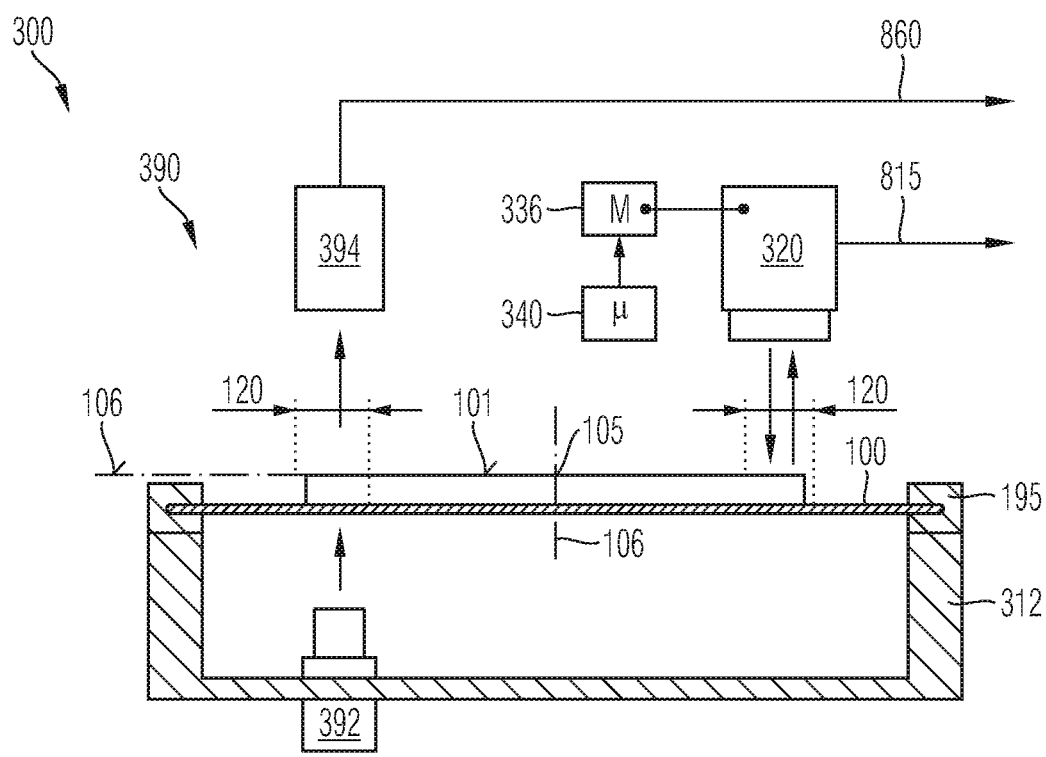
FIG. 7C is a schematic block diagram of an inspection apparatus according to an embodiment with an auxiliary detection device.

FIG. 7C shows an inspection apparatus 300 that includes an auxiliary inspection device 390 recording the intensity of a radiation that is passing through the DUT 100 or that is reflected by the DUT 100. For example, the auxiliary inspection device 390 includes an auxiliary radiation source 392, which may irradiate the DUT 100 from the backside and an auxiliary detection unit 394 detecting the intensity of the radiation emitted by the auxiliary radiation source 392 and passing through or getting reflected by the DUT 100. The auxiliary inspection device 390 may scan at least the inspection area 120 or a greater portion of the DUT surface 101. The auxiliary inspection device 390 records auxiliary data 860 which may be used to filter out uncritical height or slope information from the topography data 815.

The positioning device 330 may include a rotational motor unit 336 that is mechanically connected with the measuring device 320 and signal connected with the control device 340. The rotational motor unit 336 may rotate the measuring device 320 around a rotational axis 106 through the center point 105 and orthogonal to the DUT surface 101.

FIGS. 8A to 9E refer to further details of the process for determining position data of mechanical defects from topography data obtained along an annular inspection area.

FIG. 8A shows an intensity image of an unrolled inspection area. The intensity image of FIG. 8B includes, for each sensor unit P1 to PN a horizontal inspection line. The width of the inspection area 120 along the radial direction is about 4.8 mm.

FIG. 8B shows intensity image of magnified areas of interest within the inspection area 120 of FIG. 8A showing a wafer notch in area 1) a hairline crack in area 2) and an edge fracture in area 3).

Figure 9A:
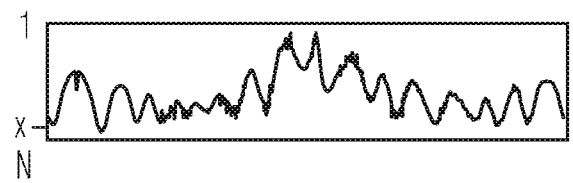
FIGS. 9A to 9E show topography and slope data for the inspection area of FIGS. 8A and 8B and for a single inspection line at different stages of processing.

FIG. 9A shows a height profile obtained from topography data recorded for the inspection area of FIG. 8A by the measuring device for pixel Px of FIG. 8A.

A data processing apparatus processes the topography data by cancelling out obvious outlayers, for example by consideration of the neighboring height profiles obtained for neighboring pixels and by filtering the height profiles using, e.g., a median filter, wherein filter coefficients of the median filter may differ among different types of DUTs.

Figure 9B:
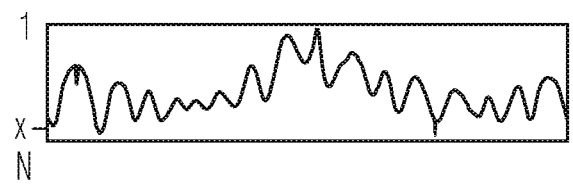

FIG. 9B shows the height line along pixel Px after removal of outlayers and filtering.

By a mathematical operation, the slope data for the inspection lines is obtained, for example, by forming the deviation of the height function along the respective inspection line.

Figure 9C:
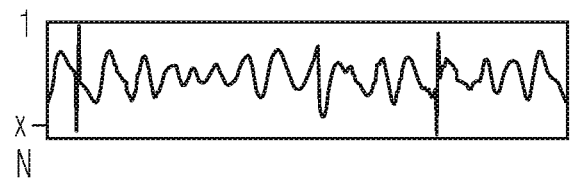

FIG. 9C shows the slope profile along the inspection line recorded by pixel Px. A further process obtains, from the slope data for each inspection line data showing the degree of change of a value of the slope data along the inspection line.

Figure 9D:
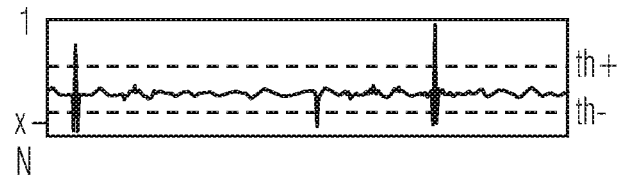

FIG. 9D visualizes the values for the change of the slope data along the inspection line of pixel Px. At three positions the value for the change of the slope data exceeds predetermined threshold values th+ and th−.

Figure 9E:
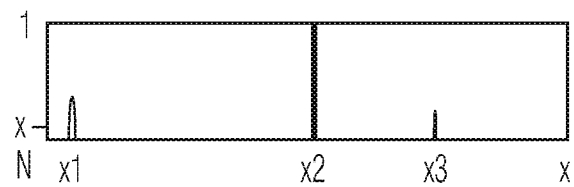

FIG. 9E is a map in which for each inspection line the position at which the value for the change of the slope exceeds the positive threshold or falls below the negative threshold is marked. The feature at x=x1 has the extension of a wafer notch and represents the notch of FIG. 8B. The feature at x=x2 is longer than the feature at x=x1 and indicates a hairline crack. The feature at x=x3 indicates an edge fracture.

FIGS. 10A to 10H refer to a deflectometry apparatus 600 that can be used for recording slope data as the first data 810 of the inspection system 960 of FIGS. 6A and 6B.

A radiation source 610 emits a stripe-shaped radiation beam with a longitudinal axis orthogonal to a propagation direction of the radiation beam.

The radiation source 610 may emit infrared radiation, ultraviolet radiation and/or visible light. The radiation emitted by the radiation source 610 passes an aperture with a single, longitudinal slit. The radiation source 610 emitting a long, narrow line of radiation is referred to as "light emitting line" 611 in the following, irrespective of that according to an embodiment the emitted radiation can contain only radiation outside the visible range.

The radiation source 610 may emit energy in the infrared and may include, e.g., a heated wire that is under mechanical tension in order to keep the heated wire straight. According to other embodiments the radiation source 610 can emit light in the UV range in order to reduce effects resulting from reflections at the back surface, e.g. in case of a substrate carrier 190 based on glass.

A detection assembly 620 includes a support device 312 and a detection device 622. The support device 312 temporarily fixes a DUT 100 that includes a semiconductor substrate 110. The detection device 622 detects radiation emitted by the radiation source 610 and reflected at a DUT surface 101 of a DUT 100 fixed on the support device 312. The detection device 622 may include a camera, wherein the camera is sensitive in a wavelength range corresponding to the emission spectrum of the radiation source 610. The detection device 622 may include further optical elements for guiding the radiation emitted by the radiation source 610 and reflected at the DUT surface 101, for example, a mirror or a beam splitter.

The detection device 622 detects radiation reflected in an inspection field 125 of the DUT surface 101. A field of view of the detection device 622 in a static state of the detection assembly 620 corresponds to or includes the inspection field 125.

The radiation source 610 and the detection assembly 620 are arranged with reference to each other such that the detection device 622 receives a stripe reflection 612 of the light emitting line 611 on the DUT surface 101, wherein the stripe reflection 612 is approximately oriented in radial direction with respect to a center point 105 of the DUT surface 101.

A positioning device 330 mechanically coupled to at least one of the radiation source 610 and the detection assembly 620 is capable of causing a relative movement between the radiation source 610 and the detection assembly 620. The relative movement may include a rotatory movement, a linear movement, or both.

A control device 340 controls the positioning device 330 to effect a relative movement between the radiation source 610 and the detection assembly 620 in first time periods in a way that from the view point of the detection device 622 the stripe reflection 612 of the light emitting line 611 moves in tangential direction from one side of the inspection field 125 to the opposite side. The relative movement in the first periods may be linear or rotatory.

In a second time period between two successive first time periods the control device 340 may control the positioning device 330 to effect a relative movement between the support device 312 with the DUT 100 on one hand and the combination of radiation source 610 and detection device 622 on the other hand. In the second time periods the support device 312 may rotate by a predefined angle such that the inspection fields 125 defined for successive first time periods overlap and the inspection fields 125 used in a sequence of first time periods cover an annular inspection area 120 with polygonal inner and outer boundary lines.

Figure 10A:
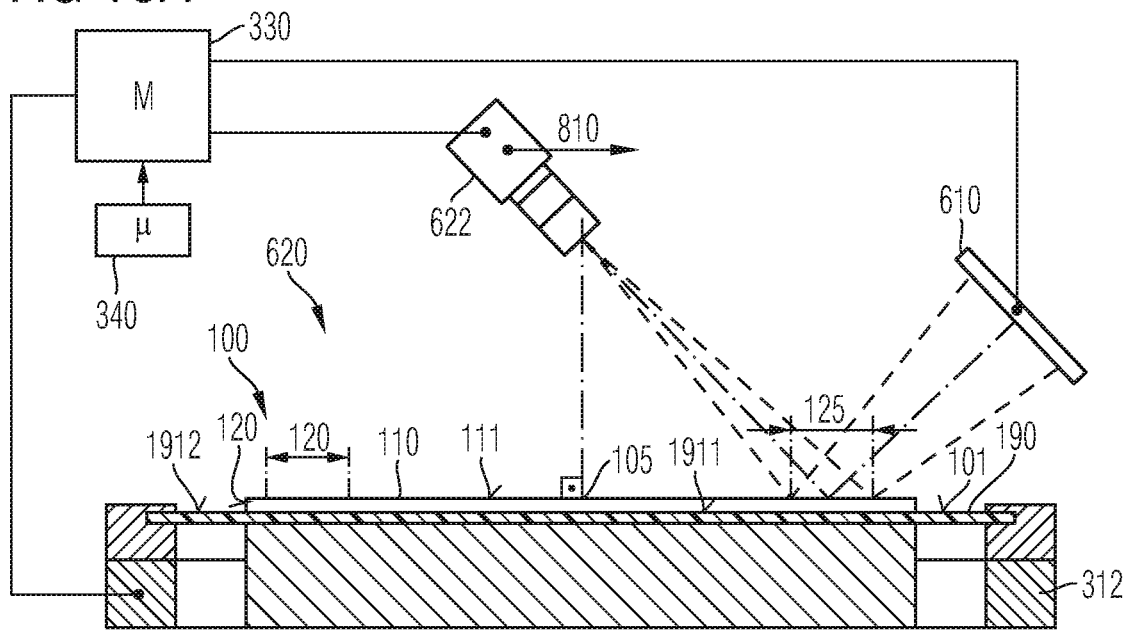
FIG. 10A is a schematic block diagram of a deflectometry apparatus with light emitting line and with a support device for DUTs including semiconductor substrates according to an embodiment.
Figure 10B:
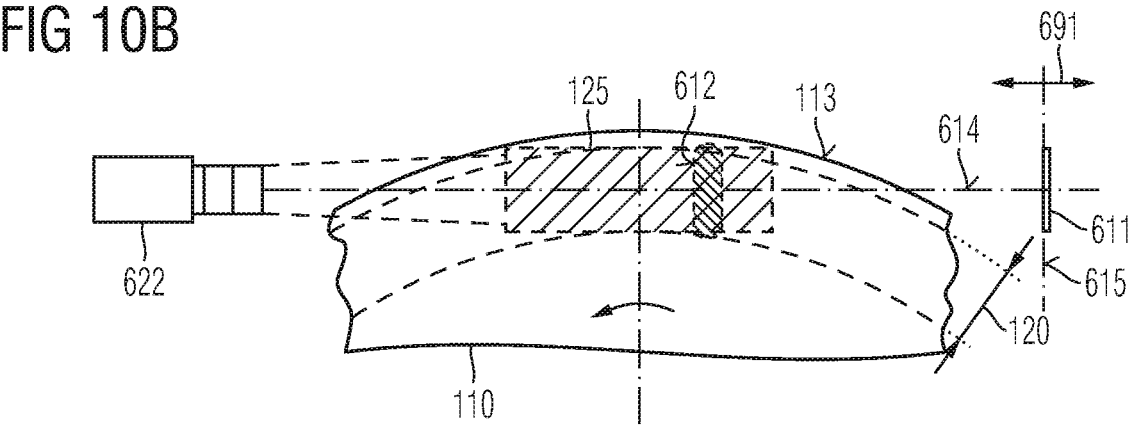
FIG. 10B is a schematic block diagram illustrating an arrangement of light emitting line, DUT and detection device according to an embodiment of FIG. 10A with the longitudinal axis of the light emitting line oriented parallel to a DUT surface.

FIGS. 10B and 10C show different embodiments for the arrangement of radiation source 610, support device 312 and detection device 622 with respect to each other.

In FIG. 10B the longitudinal axis 615 of the light emitting line 611 is parallel to the DUT surface 101. An intersection line between the DUT surface 101 and a plane, which is orthogonal to the DUT surface 101 and spanned by a direct connection line 614 between the detection device 622 and the light emitting line 611 is a secant of the circular DUT surface 101. In the field of view of the detection device 622 a reflection of the light emitting line 611 on the DUT surface 101 includes a stripe reflection 612 oriented in approximately radial direction.

In the first time periods the light emitting line 611 is moved along a linear trajectory 691 such that the stripe reflection 612 crosses the field of view of the detection device 622 and the inspection field 125 in the tangential direction.

FIGS. 10C and 10D show that the light emitted by the radiation source 610 has an approximately uniform radiation emission within a minimum angular range 613 such that the detection device 622 can detect radiation reflected near hairline cracks across the complete inspection field 125 in the set-up of FIG. 10B.

Figure 10E:
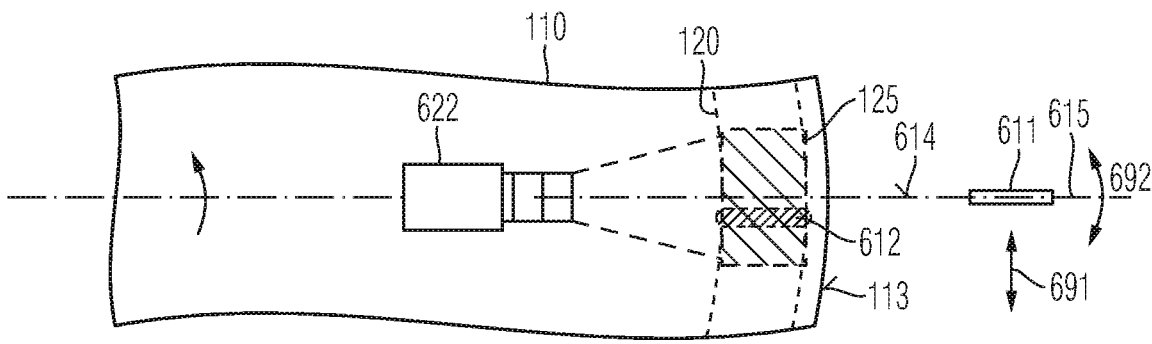
FIG. 10E is a schematic block diagram illustrating the arrangement of light emitting line, DUT and detection device according to an embodiment of FIG. 10A with the longitudinal axis of the light emitting line in a plane orthogonal to the DUT surface and through the direct connection line between detection device and light emitting line.

In FIG. 10E the longitudinal axis 615 of the light emitting line 611 is in a plane orthogonal to the DUT surface 101 and spanned by the direct connection line 614 between the detection device 622 and the light emitting line 611. An intersection line between the DUT surface 101 and the plane spanned by the direct connection line 614 over the DUT surface 101 is a diameter of a circular DUT surface. In the field of view of the detection device 622 a reflection of the light emitting line 611 on the DUT surface 101 includes a stripe reflection 612 oriented in approximately radial direction.

In the first time periods the light emitting line 611 may be moved along a linear trajectory 691 in tangential direction with respect to a circle around the center point 105 or along a rotatory trajectory 692 such that the stripe reflection 612 crosses the field of view and the inspection field 125 in the tangential direction.

FIGS. 10F and 10G show that the light emitted by the radiation source 610 has an approximately uniform radiation emission within a minimum angular range 613 such that the detection device 622 can detect radiation reflected near hairline cracks across the complete inspection field 125 in the set-up of FIG. 10E.

Figure 10H:
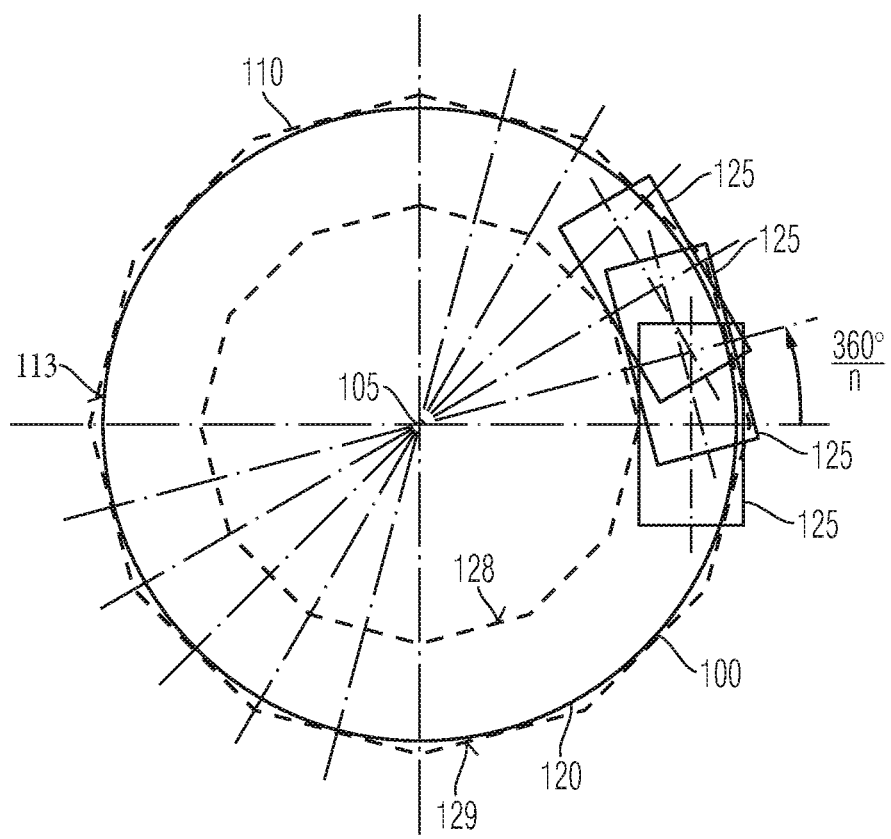
FIG. 10H is a schematic plan view of a main surface of a semiconductor substrate for illustrating inspection fields of the deflectometry apparatus of FIG. 10A.

FIG. 10H shows the inspection fields 125 for a sequence of first time periods. The inspection fields 125 of successive first time periods may overlap and cover an annular inspection area 120 with polygonal inner and outer boundary lines 128, 129. A width of the inspection area 120 may be in a range from 2 mm to 60 mm, e.g., in a range from 20 mm to 40 mm. A distance between the outer boundary line 129 and the perimeter of the semiconductor substrate 110 may be less than 4 mm, e.g., less than 1 mm. According to an embodiment, the inspection area 120 may laterally extend beyond the outer surface 113 of the semiconductor substrate 110 along the complete perimeter.

Hairline cracks and folds in a foil-type substrate carrier 190 typically appear along the perimeter of a semiconductor substrate 110 and in a portion of the foil-type substrate carrier 190 between the frame 195 and the semiconductor substrate 110 and effect abrupt or discontinuous changes or characteristics in the surface slope recorded in tangential direction to the perimeter.

The deflectometry apparatus 600 is capable of selectively recording the surface slope in substantially tangential direction to the perimeter of the semiconductor substrate 110 in an annular inspection area 120 close to or overlapping with the perimeter of the semiconductor substrate 110.

The deflectometry apparatus 600 facilitates inspection of patterned surfaces and inspection of semiconductor substrates mounted on arbitrary types of substrate carriers. Hairline cracks can be easily distinguished from other defect classes like grinding grooves and from edges that appear at the transition of structures at different height layers. The approach is applicable for a comparatively wide range of surface roughness and comparatively insensitive to the presence of thin films. By recording directly the slope in tangential direction an elaborate evaluation of data obtained for an orthogonal coordinate system can be omitted. The inspection area may cover the edge exclusion area.

In general, with the deflectometric principle the slope can be measured on a specular surface in x-direction and y-direction and therefore x and y coordinates must be coded on a flat light generator. For PMD this coding is done with horizontal and vertical sinusoidal fringe patterns that are displayed on a monitor or with a beamer on a screen.

Instead the deflectometry apparatus 600 codes radiation only in a single coordinate direction. This can be achieved by the single straight light emitting line 611 of FIGS. 10B and 10C that is mechanically moved such that for the detection device 622 the reflection of the light emitting line 611 moves along a direction tangential to the inspection area 120 through the field of view of the detection device 622.

Figure 11:
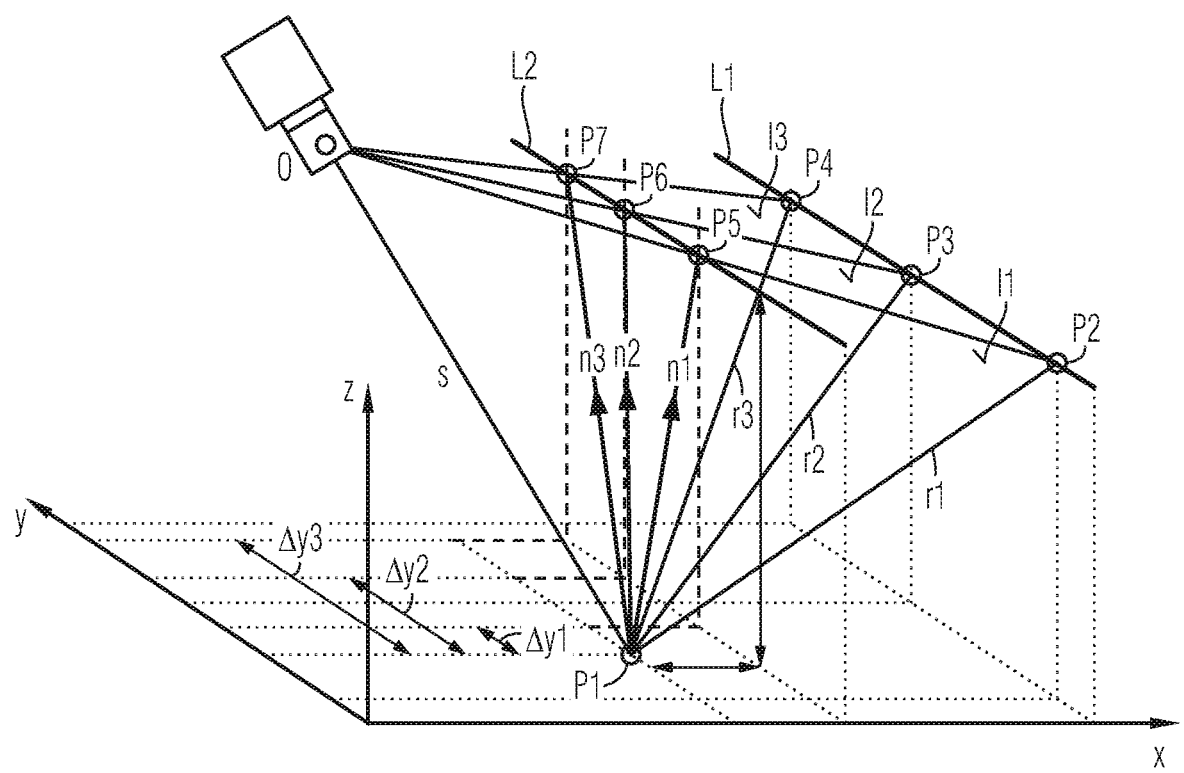
FIG. 11 is a schematic diagram for illustrating the mode of operation of the deflectometry apparatus of FIG. 10A.

FIG. 11 illustrates a way to measure the slope in x-direction for a surface point P1 in case the direction of a reflected camera ray is measured up to one degree of freedom. The degree of freedom of the reflected camera ray is along the light emitting line L1. For example the reflected camera ray can intersect the light emitting line L1 at P2, P3 or P4 and therefore corresponds with the line r1, r2 or r3 respectively. The surface normal has only one degree of freedom left because all lines that contain the surface point P1 and that have the same directions as the surface normals intersect with line L2. For example for the reflected camera ray corresponding with the line r1, r2 or r3 the surface normal at point P1 is in the direction of n1, n2 or n3 respectively. FIG. 11 shows that the surface normals n1, n2 and n3 intersect the lines l1, l2 and l3 at points P5, P6 and P7 which are also located on a line L2 that is in parallel to the line L1.

Since in a geometrically calibrated system of the deflectometry apparatus 600 of FIG. 10A the components Δx and Δz are obtained by measurement the slope in x-direction, which is defined by Δx/Δz, can be calculated, if the light emitting line L1 is parallel to the y-coordinate of the Cartesian coordinate system.

Figure 12A:
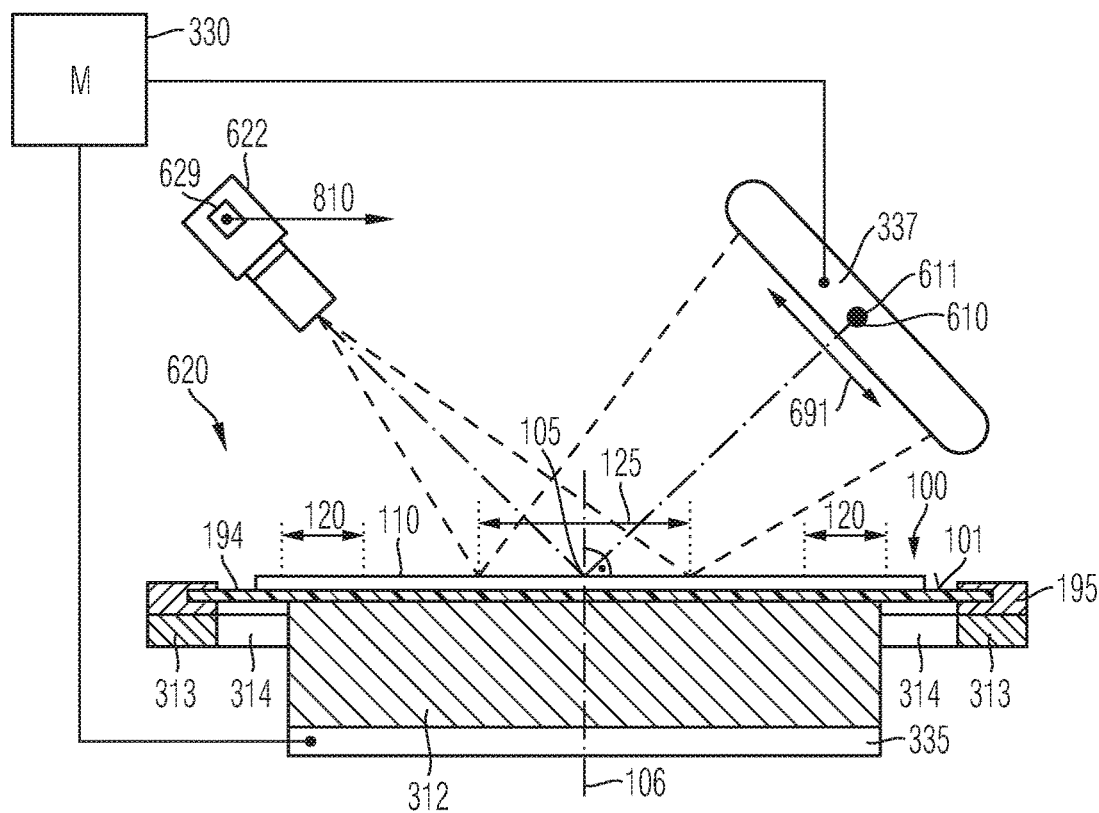
FIG. 12A shows a vertical cross-section of a schematically illustrated deflectometry apparatus according to an embodiment related to a linear movement between light emitting line and a detection assembly.
Figure 12B:
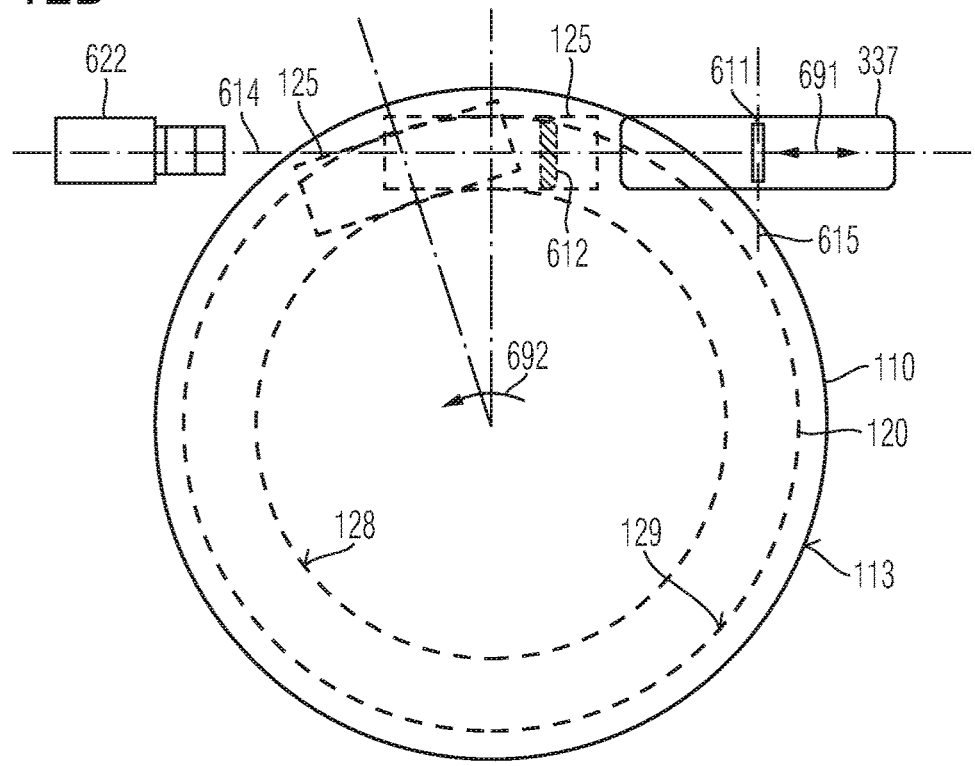
FIG. 12B is a simplified plan view of a DUT inspected with the deflectometry apparatus of FIG. 12A.

FIGS. 12A and 12B refer to an embodiment of a deflectometry apparatus 600 with an arrangement of light emitting line 611, support device 312 and detection device 622 similar to that shown in FIG. 10B. The radiation source 610 and the detection device 622 are arranged on opposite sides of the inspection field 125.

The DUT 100 that includes at least a semiconductor substrate 110 rests on the support device 312, wherein the semiconductor substrate may be a processed silicon wafer with a diameter of 200 mm. A backside of the semiconductor substrate 110 is attached to a dicing tape 194, which is fixed by a frame 195. A positioning device 330 is mechanically coupled to the radiation source 610 and facilitates a movement of the light emitting line 611 along a linear trajectory 691 which may be perpendicular to the propagation direction of the emitted radiation. The positioning device 330 is further mechanically coupled to the support device 312 and facilitates a rotatory movement of the support device 312 and the semiconductor substrate 110 around a rotational axis 106 through the center point 105 of the semiconductor substrate 110. The support device 312 may include a chuck.

For example, the positioning device 330 includes a rotational motor drive 335 that rotates the support device 312 around the center point 105. The rotational motor drive 335 and the support device 312 may be integrated in a rotation chuck. The support device 312 may have a circular area with a diameter smaller than the semiconductor substrate 110 where the semiconductor substrate 110 is positioned in a pre-aligned status during the inspection. The support device 312 may include a support ring 313 held by support arms 314 that may be arranged at an angle of 120° to each other. The frame 195 may rest on the support ring 313.

The support device 312 may temporarily fix the DUT, e.g., by electrostatic force or by negative pressure. For example, the support ring 313 may fix the frame 195 by electrostatic force or negative pressure, whereas below the semiconductor substrate 110 the DUT 100 only rests upon the support device 312. According to another embodiment the support device 312 may exert electrostatic force or negative pressure only in a small section of the total area, in which the DUT 100 rests on the support device 312.

During the inspection the dicing tape 194 is facing downwards and the main surface 111 of the semiconductor substrate 110 faces upwards. A control device 340, e.g., a PLC (programmable logic controller) may control the rotational motor drive 335.

The detection device 622 may be oriented to the semiconductor substrate 110 such that a field of view of the detection device 622 is completely on the main surface 111 or extends beyond an outer surface 113 of the semiconductor substrate 110. A number of inspections fields 125 of the same size and shape form an annular inspection area 120 with regular, concentric polygonal inner and outer boundary lines 128, 129 approximated by circular lines in the FIGS.

The inspection area 120 includes an outer portion of the front side of the semiconductor substrate 110 and may include a portion of the dicing tape 194. The common center of the inner and outer boundary lines 128, 129 is located in the center of the semiconductor substrate 110. The mean inner diameter of the inspection area 120 may be in a range from 50 mm to 80 mm, e.g., about 65 mm. The mean inner diameter of the inspection area 120 may be between 90 mm and 110 mm, e.g., about 105 mm.

The detection device 622 may include a monochrome camera that includes an image sensor unit, e.g., a CMOS sensor with a sensor size of about 2500×2000 pixels. The size of a single pixel may be 6×6 μm. The detection device 622 may include a lens with a focal length of, e.g., 90 mm mounted in front of the camera. The magnification is chosen in such a way that the lateral resolution of the detection device 622 on the main surface 111 is about 15 μm per pixel.

The field of view of the detection device 622 on the DUT surface 101 may correspond to or include a rectangular inspection field 125 of at least about 40 mm×35 mm, wherein in the radial direction the detection device 622 images approximately 35 mm of the semiconductor substrate 110 and 5 mm of the dicing tape. During first time periods a single inspection field 125 is inspected. In second time periods between successive first time periods the semiconductor substrate 110 is rotated by 15° in order to move another inspection field 125 on a track parallel to the perimeter of the semiconductor substrate 110 into the field of view of the detection device 622. After 24 of the second time periods each inspection field 125 has been brought into the field of view of the detection device 622. The step size of the rotation may be smaller than the angular coverage of the field of view to ensure sufficient overlap in the images the detection device 622 successively acquires along the inspection area 120. For example the step size of the rotational movement is 15° and the field of view covers 20° at the perimeter of the wafer.

The radiation source 610 may include an LED (light emitting device) having an active illumination area of about 150×35 mm and a first slit aperture with a width of about 1 mm and a length of about 150 mm. The slit aperture narrows the emitting area of the light to a narrow line. A second slit aperture mounted symmetrically to the first slit aperture limits the angle of radiation of the light to a defined angle in order to reduce interfering light as well as direct and indirect glare in case of not completely lightproof inspection modules. For example a width of the second slit aperture may be about 5 mm and the distance to the first slit aperture may be about 5 mm. The narrow light line emitted by the radiation source 610 is referred to as light emitting line 611 in the context of this disclosure. The emission of the light emitting line 611 is approximately uniform within an angular range of about 30°.

The radiation source 610 may be mounted on a sliding table 337 facilitating a movement of the radiation source 610 along a linear trajectory 691 orthogonal to a propagation direction of the radiation. A longitudinal axis 615 of the light emitting line 611 is arranged such that the reflection of the light emitting line 611 on a flat main surface 111 of a semiconductor substrate 110 mounted on the support device 312 is a stripe reflection 612 approximately orientated in radial direction to a center point 105 of the semiconductor substrate 110.

When the light emitting line 611 is moved along the linear trajectory 691 orthogonal to a propagation direction of the radiation, the reflection of the light emitting line 611 on a flat main surface 111 moves in the field of view of the detection device 622 approximately in tangential direction to the perimeter of the semiconductor substrate 110. Start and end positions for the movement along the linear trajectory are adjusted in such a way that the reflection of the light emitting line on a flat wafer reaches all positions within the field of view of the detection device 622 even in the presence of a tolerable wafer bow.

While the light emitting line 611 moves along the linear trajectory 691 the detection device 622 may record a sequence of images. The image information obtained from a single inspection field 125 represents a subset of the first data 810 that may be transmitted to a data processing apparatus 400 as illustrated in FIG. 6A.

The data processing apparatus may analyze each data subset, wherein the sequence of images may be interpreted as a stack of images. The horizontal axes of the image stack represent the position of an image pixel within the image coordinate system. The vertical axis of the image stack represents an image index for defining the position of the image in the image sequence. The first image index is zero and the last image index is equal to the number of images minus one within the image sequence. At each image pixel position the image index of that image that has the highest intensity value at that pixel position is searched for.

A first auxiliary image with the same size as a single one of the image may be generated. At each image position of the first auxiliary image the image index of that image that has the highest intensity value at that pixel position within the image stack may be written.

A bit depth of the first auxiliary image may be selected according to the number of images within the image sequence. For example, a bit depth of 8-bit can be used for an image sequence of up to 256 images and a bit depth of 10-bit can be used for an image sequence of up to 1024 images.

In the following the first auxiliary image is referred to as "index image". The index image contains data that is already related to the local slope in tangential direction to the edge of the wafer. A scaled and offset corrected version of this image may be used for detecting defects that show up as abrupt or discontinuous slope changes or other sorts of slope characteristics.

In addition, the data processing apparatus may analyze the absolute values of the detected image intensities in each data subset.

For example, a second auxiliary image with the size of a single image of the image stack may be generated, wherein at each image position of the second auxiliary image the image intensity of that image is written that has the highest intensity value at that pixel position within the image stack. The bit depth of the second auxiliary image may be the same as the bit depth of a single image. The second auxiliary image represents a "bright field image".

A third auxiliary image with the size of a single image of the image stack may be generated, wherein at each image position of the third auxiliary image the image intensity of that image is written that has the lowest intensity value at that pixel position within the image stack. The bit depth of the third auxiliary image may be the same as the bit depth of a single image. The third auxiliary image represents a "dark field image".

Information contained in the bright field image and the dark field image can be combined with the information contained in the index image to improve defect detection.

In order to compute the real slope data in tangential direction to the edge of the semiconductor substrate this data still needs to be scaled, offset corrected and coordinate transformed. To this purpose the whole setup including detection device 622, support device 312 and light emitting line 611 are geometrically calibrated. The detection device 622 can be calibrated intrinsically and extrinsically. Subsequent to an intrinsic calibration, the detection device 622 may be calibrated extrinsically by placing a calibration DUT 100 on the support device 312, wherein the calibration DUT 100 includes a calibration target in the field of view of the detection device 622. The position and orientation of the calibration DUT also defines a three-dimensional Cartesian coordinate system. Based on the extrinsic calibration the position and orientation of the detection device 622 is related to this three-dimensional coordinate system.

The setup for the light emitting line 611 can be geometrically calibrated by placing a calibration DUT 100 with a specular surface and a surface as flat as possible on the support device 312. With the calibration DUT 100 on the support device 312 an image sequence is acquired with the detection device 622 in the same way at it is done for the inspection. Based on this image sequences and the calibration parameter of the detection device 622 the light emitting line 611 can be calibrated.

Based on the geometric calibration a set of transformation parameter is computed. For each inspection the index image is transformed based on the set of transformation parameter. The transformation results in a slope image where each pixel corresponds to the slope value in tangential direction to the edge of the wafer. These slope values are defined with reference to the image coordinate system. The slope values can further be transformed to a wafer coordinate system or to a polar coordinate system. In case of a polar coordinate system the slope values in tangential direction to the edge of the wafer can also be viewed as a flat projection image. For all geometric transformations described above the slope will always be in the direction that is in parallel to the edge of the wafer. The defect detection can be done in any of the transformed slope images. Defects can be detected in these images based on abrupt or discontinuous slope changes or certain slope characteristics.

All bright field images and dark field images can also be geometrically transformed from the image coordinate system to a wafer coordinate system or to a polar coordinate system. In case of a polar coordinate system the bright field and the dark field image can also be viewed as a flat projection image. The geometrically transformed bright field and dark field images can be used for defect detection in addition to the geometrically transformed slope image.

Image acquisition and processing time can be reduced by providing a detection device 622 with a fast data interface.

The detection device 622 of FIGS. 12A and 12B includes an integrated processing device 629 that may include, e.g., an integrated FPGA (field programmable gate array), a processor or a processor board. For example, the detection device 622 may be a smart camera. The processing device 629 may generate the index image, the bright field image and the dark field image. Instead of the information about several hundred images the first data 810 may include only the information about three images. Therefore the data transmission rate between the detection device 622 and the data processing apparatus 400 of FIG. 6A can be drastically reduced.

According to other embodiments, the processing device 629 embodies a further portion of the data processing apparatus 400 of FIG. 6A and may transform image coordinates and may perform further processing, e.g., evaluation of the position data.

Figure 13A:
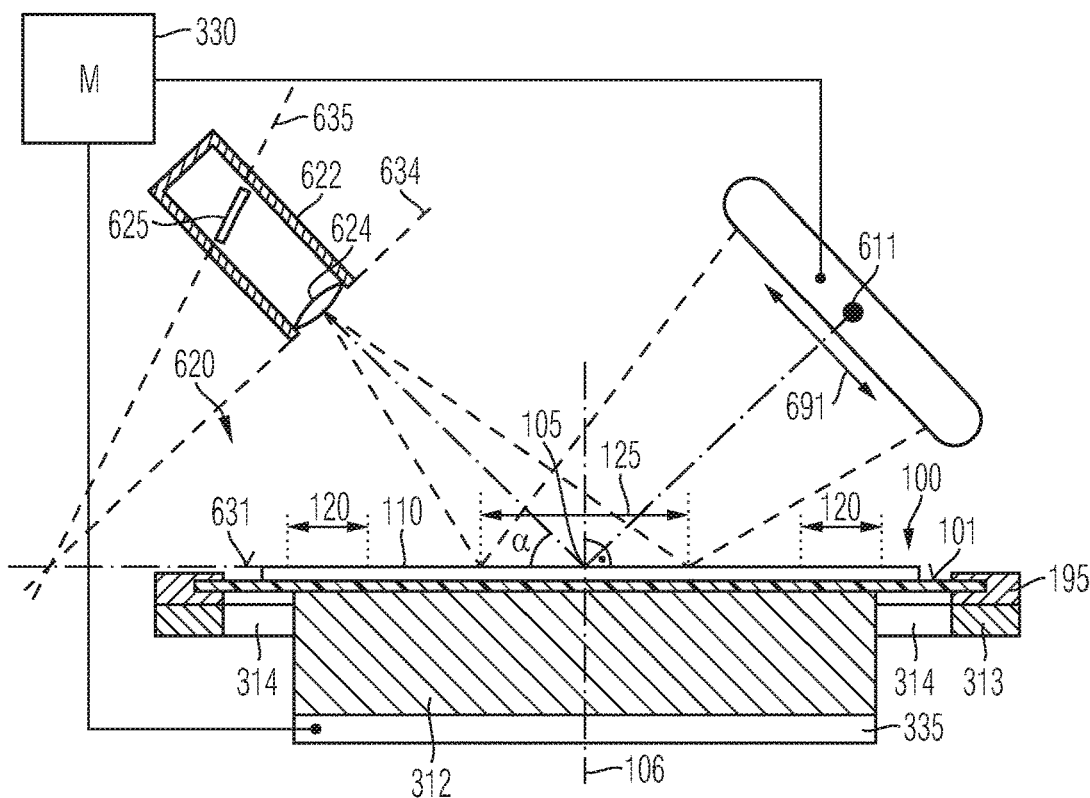
FIG. 13A shows a vertical cross-section of a schematically illustrated deflectometry apparatus according to an embodiment related to a Scheimpflug configuration of a sensor plane and a lens plane.

In FIG. 13A the detection device 622 of a deflectometry apparatus 600 includes an image sensor unit 625, e.g., a CMOS sensor arranged in a sensor plane 635 and a lens 624, which is positioned in a lens plane 634 in front of the image sensor unit 625. The sensor plane 635 and the lens plane 634 intersect the object plane 631, which is the plane of a hypothetical flat main surface 111 along the same cross-sectional line such that the Scheimpflug rule is fulfilled. The Scheimpflug principle is a geometric rule that describes the orientation of the plane of focus of an optical system (such as a camera) when the lens plane is not parallel to the image plane.

Under the condition that the Scheimpflug rule is fulfilled the complete or at least a great portion of the field of view of the detection device 622 can be in focus even at comparatively flat inspection angles α between the optical axis 623 of detection device 622 and the object plane 631. A flat inspection angle α allows, e.g., the inspection of surfaces that appear specular only in the infrared range of light, e.g., surfaces with high surface roughness. In addition a lens with a comparatively small aperture, i.e., with a high aperture number and comparatively high focal number may be used to increase the distance between the detection device 622 and the main surface 111 in order to increase the depth of focus. Instead of the Scheimpflug rule, the detection device 622 may be arranged to fulfil the Hinge rule.

According to an embodiment also the light emitting line 611 may be arranged according to one of these rules, at least in such a way that the reflection of the light emitting line 611 appears in the image with the same blurring along the complete line length. This can be combined with light emittance angles of the light emitting line 611 that are adapted for this arrangement. Mechanical settings for Scheimpflug or the Hinge Rule can be fixed for a selected inspection angle α and can be varied by a motor drive or a user, wherein specific settings may be stored in a lookup-table assigning to each inspection angle α specific mechanical setting.

Figure 13B:
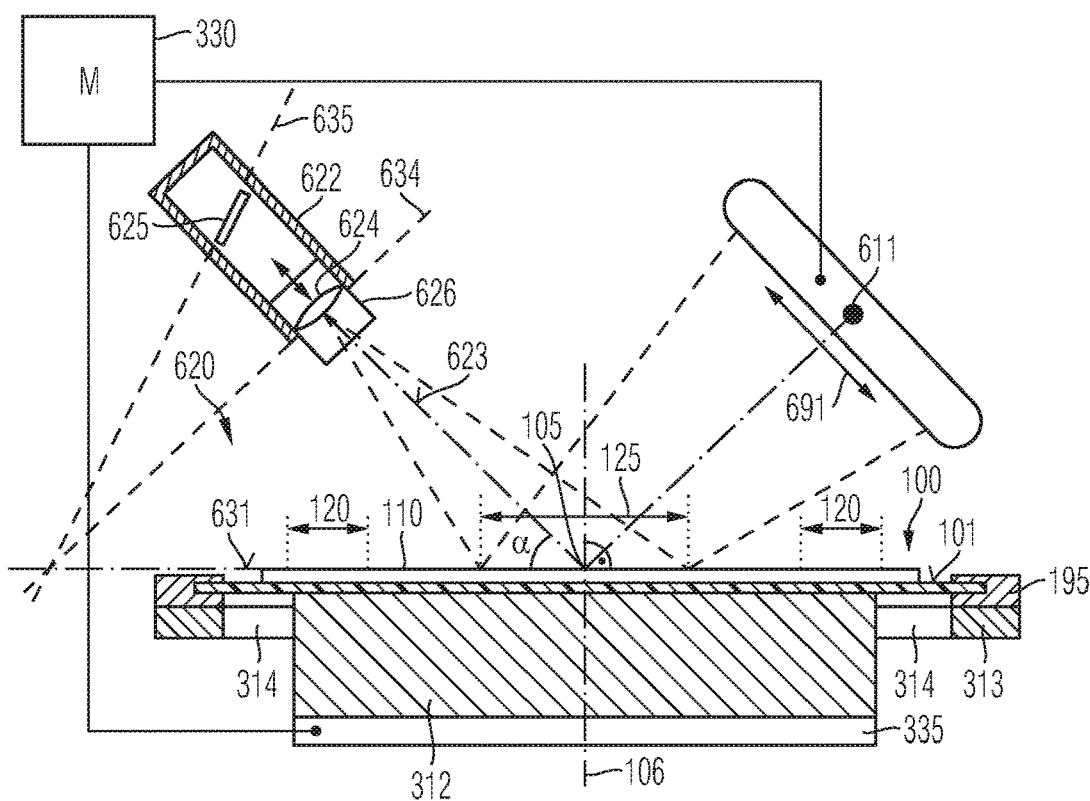
FIG. 13B shows a vertical cross-section of a schematically illustrated deflectometry apparatus according to an embodiment related to a detection device with a movable lens.

FIG. 13B shows a detection device 622 with a lens 624 and a lens motor unit 626 that shifts the lens 624 along the optical axis 623 of the detection device 622 during the first time periods to compensate for different resolution distances across the inspection field 125. The movable lens 624 may be combined with the Scheimpflug or the Hinge Rule. Instead or in addition to be moveable, the lens 624 may be focus-variable, magnification-variable and/or aperture-variable.

Figure 13C:
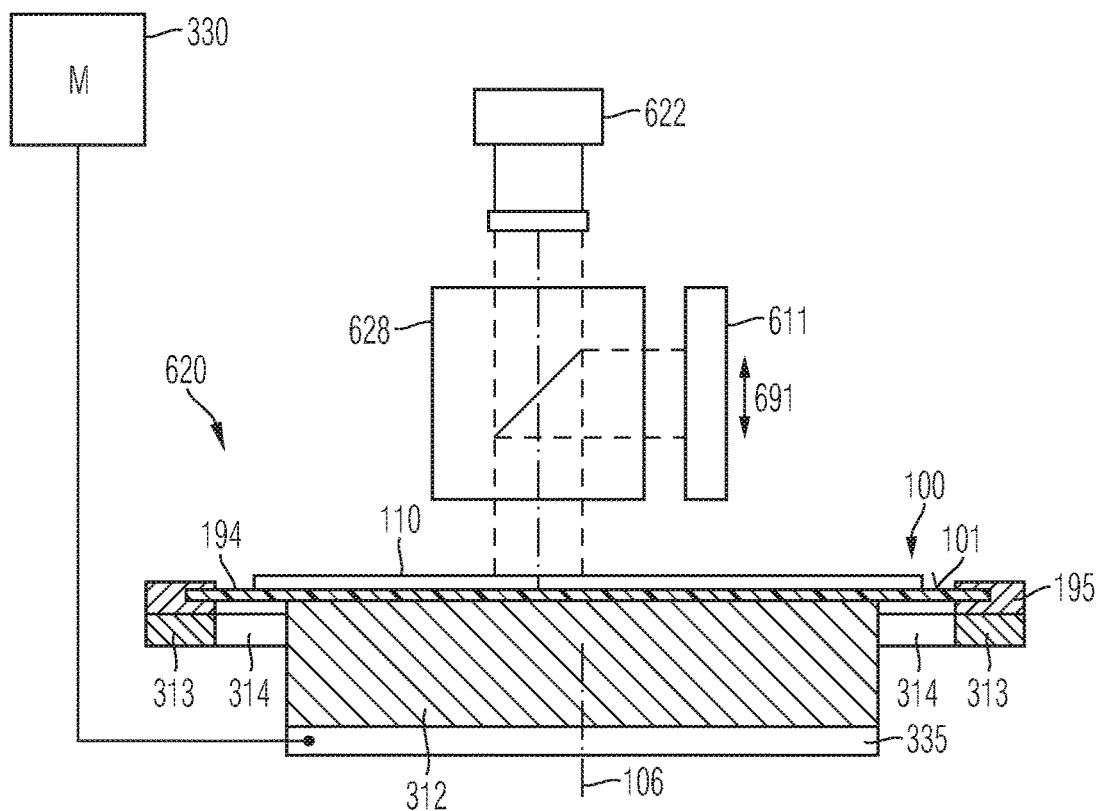
FIG. 13C shows a vertical cross-section of a schematically illustrated deflectometry apparatus according to an embodiment with a beam splitter unit.

In FIG. 13C the deflectometry apparatus includes at least one beam splitter unit 628. A main body of the detection device 622 is arranged above the DUT surface 101 such that the optical axis of the detection device 622 is orthogonal to the DUT surface 101. A beam splitter device 628 positioned between the DUT surface 101 and the detection device 622 deflects radiation emitted from the light emitting line 611 in a direction parallel to the DUT surface 101 into a direction orthogonal to the DUT surface 101, wherein the deflected radiation reaches the DUT surface 101 in the inspection field 125. The reflected radiation may pass the beam splitter unit 628 undeflected and is detected by the detection device 622. A linear movement of the light emitting line 611 in the vertical direction results in a movement of the stripe reflection from one side of the inspection field 125 to the opposite side in the tangential direction.

Figure 13D:
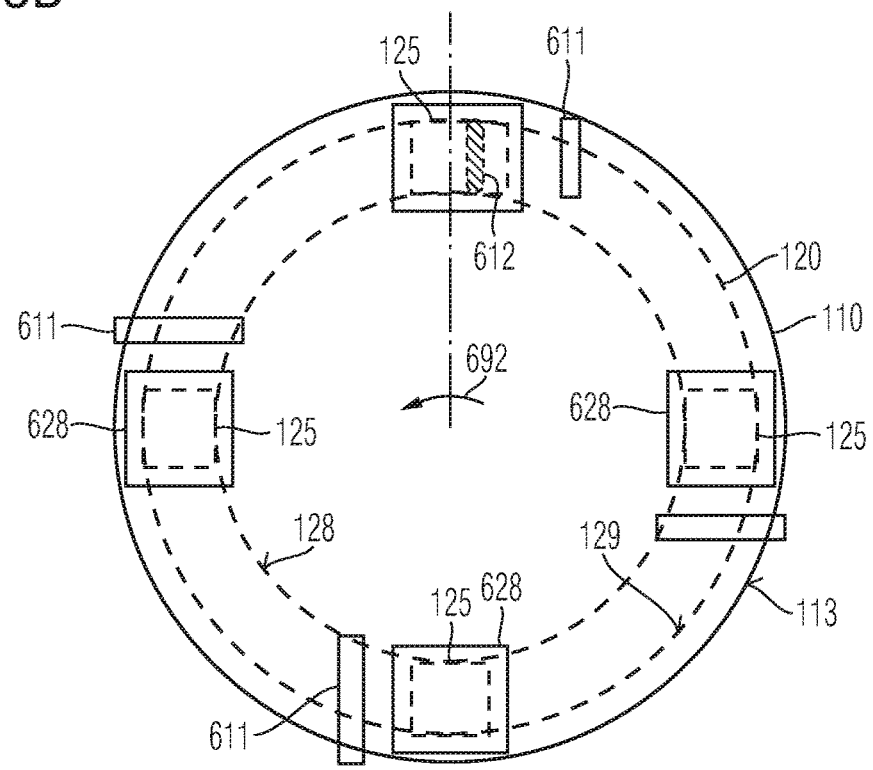
FIG. 13D is a simplified plan view of a DUT inspected with the deflectometry apparatus of FIG. 13C.

FIG. 13D is a simplified plan view of a DUT inspected in a deflectometry apparatus that includes four inspection groups, wherein each inspection group includes a beam splitter unit 628, a detection device 622 and a light emitting line 611. The light emitting lines 611 of all four inspection groups may be moved by the same motor stage.

Figure 14A:
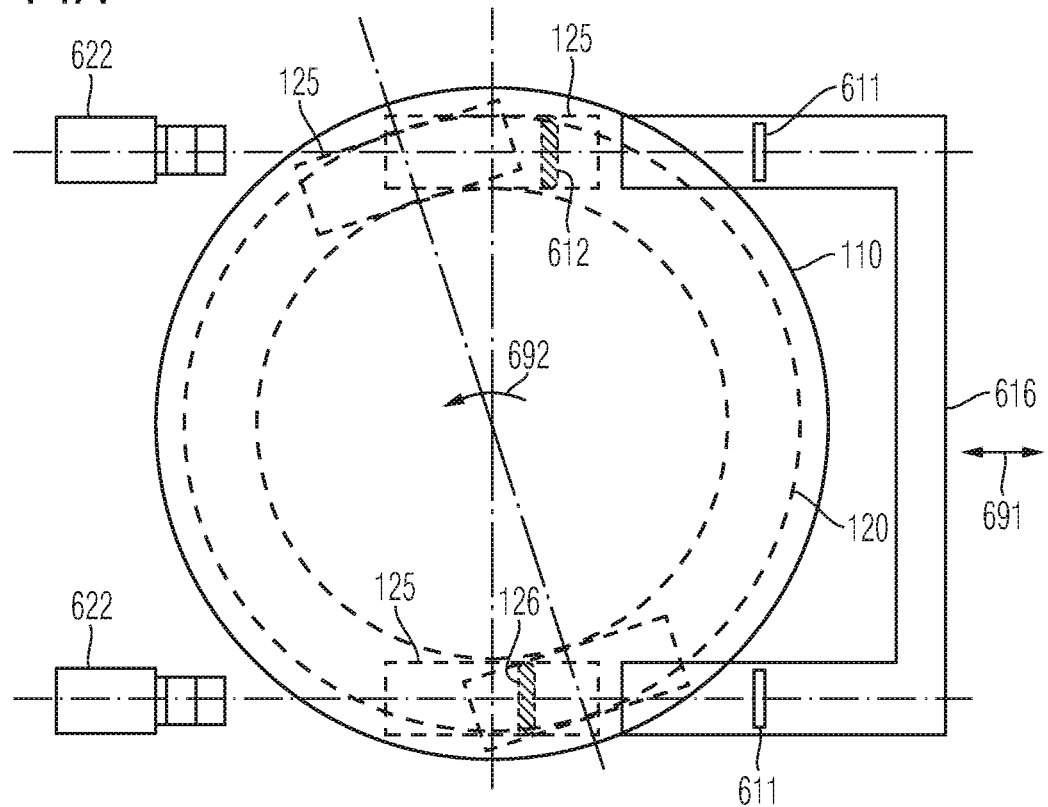
FIG. 14A shows a plan view of a DUT inspected with a schematically illustrated deflectometry apparatus according to an embodiment with two detection devices and two coupled light emitting lines.
Figure 14B:
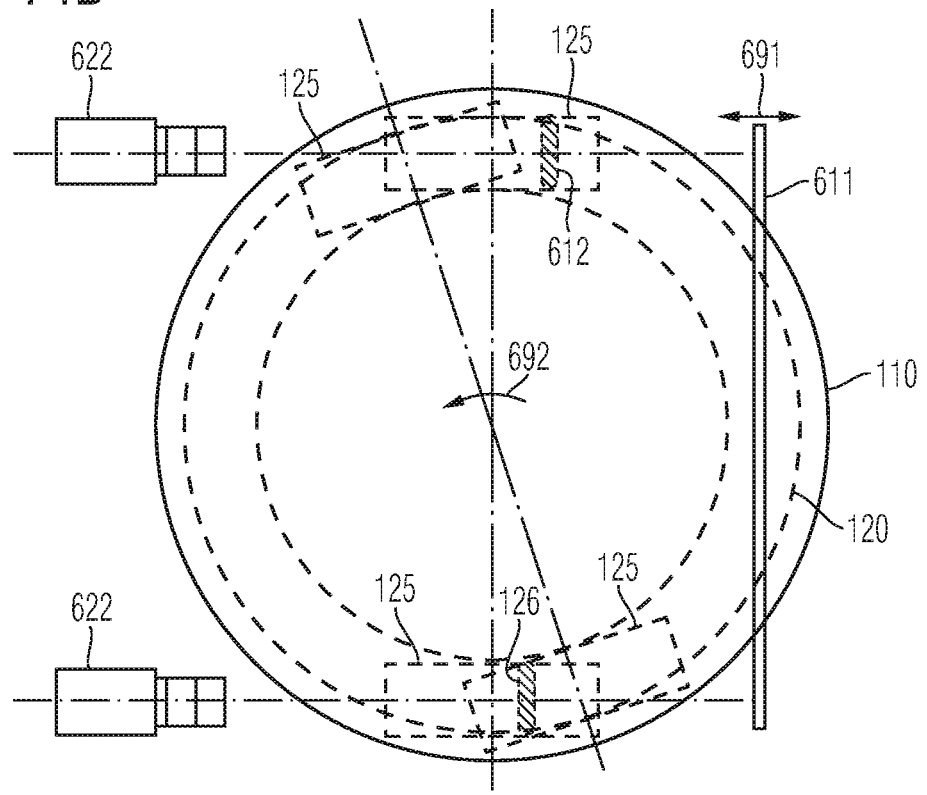
FIG. 14B shows a plan view of a DUT inspected with the schematically illustrated deflectometry apparatus according to an embodiment with two detection devices and one long light emitting line.

FIGS. 14A and 14B refer to a deflectometry apparatus with two detection devices 622 with parallel optical axes but shifted to each other parallel to the object plane such that the fields of view of the two detection devices 622 are separated by an angular distance of 180° from each other. The two detection devices 622 can record the images in parallel such that overall image inspection time is reduced to the half time.

FIG. 14A shows two light emitting lines 611, each of them assigned to one of the detection devices 622. The light emitting lines 611 may be assigned to a common auxiliary carrier 616 and a movement of the auxiliary carrier 616 effects a parallel movement of the two light emitting lines 611.

FIG. 14B shows a deflectometry apparatus 600 with two detection devices 622 and one light emitting line 611 with a sufficient longitudinal extension to contemporaneously irradiate two inspection fields 125 on opposite sides of the center point 105.

Figure 15A:
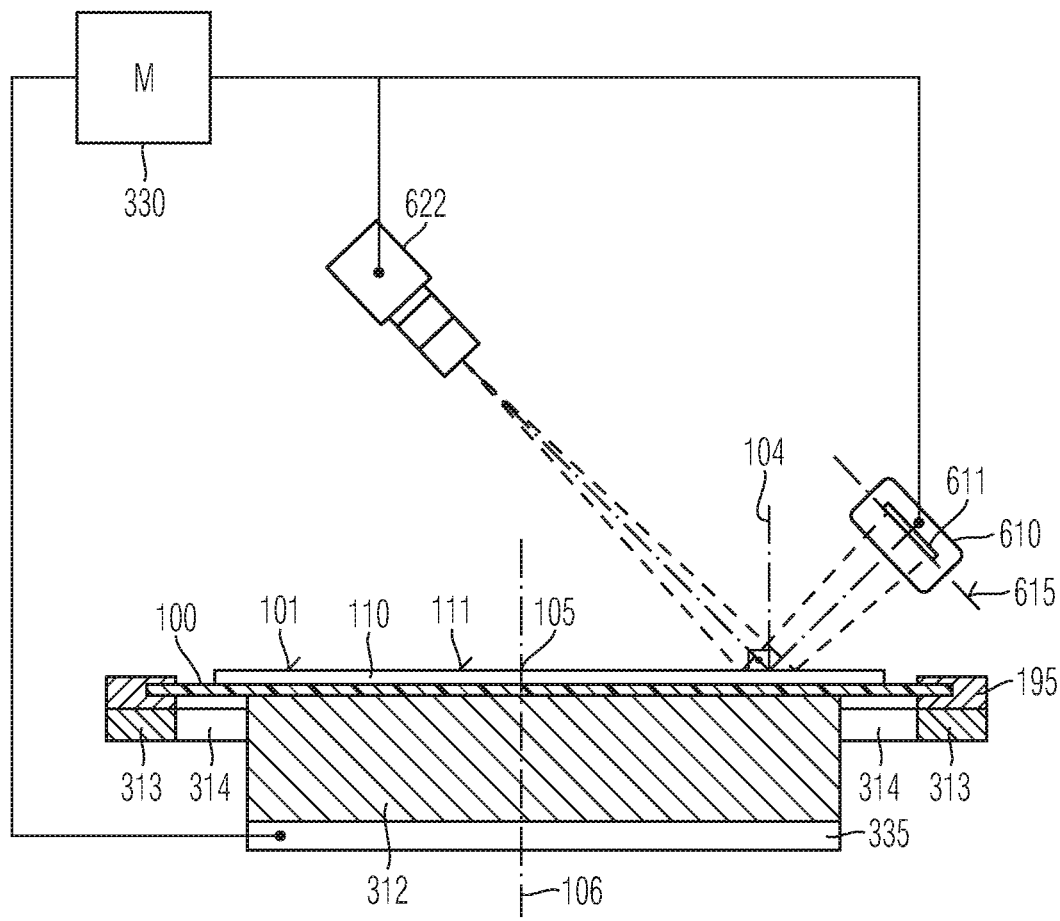
FIG. 15A shows a vertical cross-section of a schematically illustrated deflectometry apparatus according to an embodiment with the light emitting line and the detection device arranged along a diameter line through the center point of the DUT.
Figure 15B:
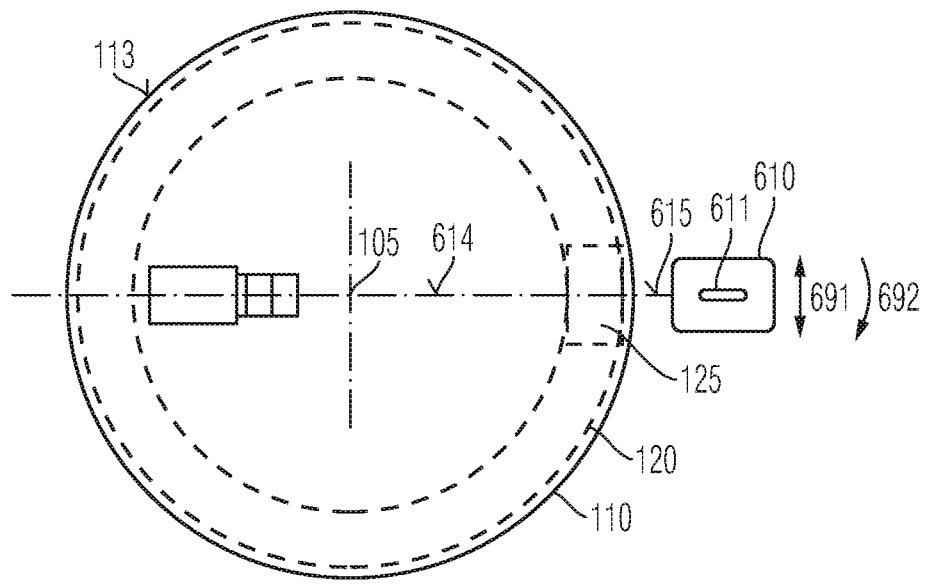
FIG. 15B is a simplified plan view of a DUT inspected with the deflectometry apparatus of FIG. 15A.

FIGS. 15A and 15B refer to a deflectometry apparatus according to the approach of FIG. 10C. The longitudinal axis 615 of the light emitting line 611 is in a plane orthogonal to the DUT surface 101 and spanned by the direct connection line 614 between the detection device 622 and the light emitting line 611. An intersection line between the DUT surface 101 and the plane spanned by the direct connection line 614 is part of a diameter. In the field of view of the detection device 622 a reflection of the light emitting line 611 on the DUT surface 101 includes a stripe reflection 612 oriented in approximately radial direction.

In the first time periods the light emitting line 611 may be moved along a linear trajectory 691 in tangential direction with respect to a circle around the center point 105 or along a rotatory trajectory 692 such that the stripe reflection 612 crosses the field of view and the inspection field 125 in the tangential direction.

The deflectometry apparatus 600 of FIGS. 15A and 15B may be used for types of DUTs 100 that show interference patterns depended on the rotational orientation of the DUT 100, e.g., DUTs 100 with semiconductor substrates 110 including thin transparent films. At certain rotation angles such interference patterns may produce noise in the index image. It could be shown that the problem of interference patterns may be mitigated by placing the detection device 622 in a way that a plane orthogonal to the object plane 631 and spanned by the optical axis 623 of the detection device 622 runs in the radial direction to the center point 105.

Figure 16A:
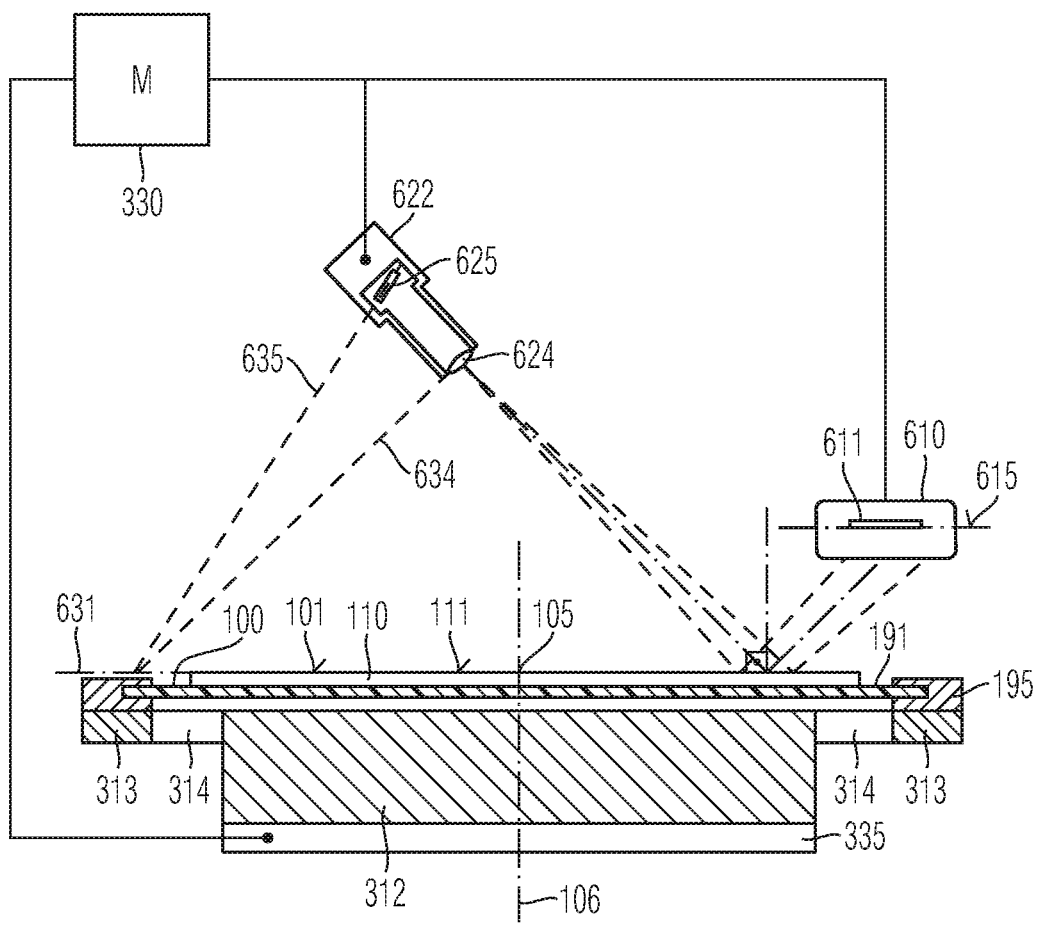
FIG. 16A shows a vertical cross-section of a schematically illustrated deflectometry apparatus according to an embodiment with the light emitting line and the detection device arranged along a diameter line through the center point of the DUT and a with a Scheimpflug configuration of sensor plane and lens plane.
Figure 16B:
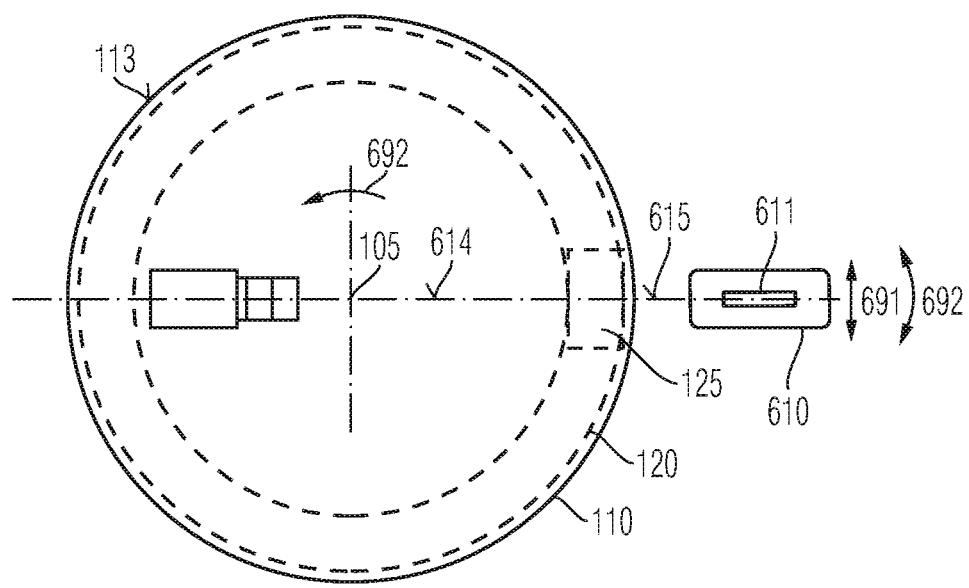
FIG. 16B is a simplified plan view of a DUT inspected with the deflectometry apparatus of FIG. 16A.

In the deflectometry apparatus of FIGS. 16A and 16B Scheimpflug rule is fulfilled, wherein a sensor plane 635 and a lens plane 634 intersect the object plane 631 along the same cross-sectional line. Also according to this embodiment, the longitudinal axis 615 of the light emitting line 611 is oriented parallel to the main surface 111 of the semiconductor substrate 110.

Figure 17A:
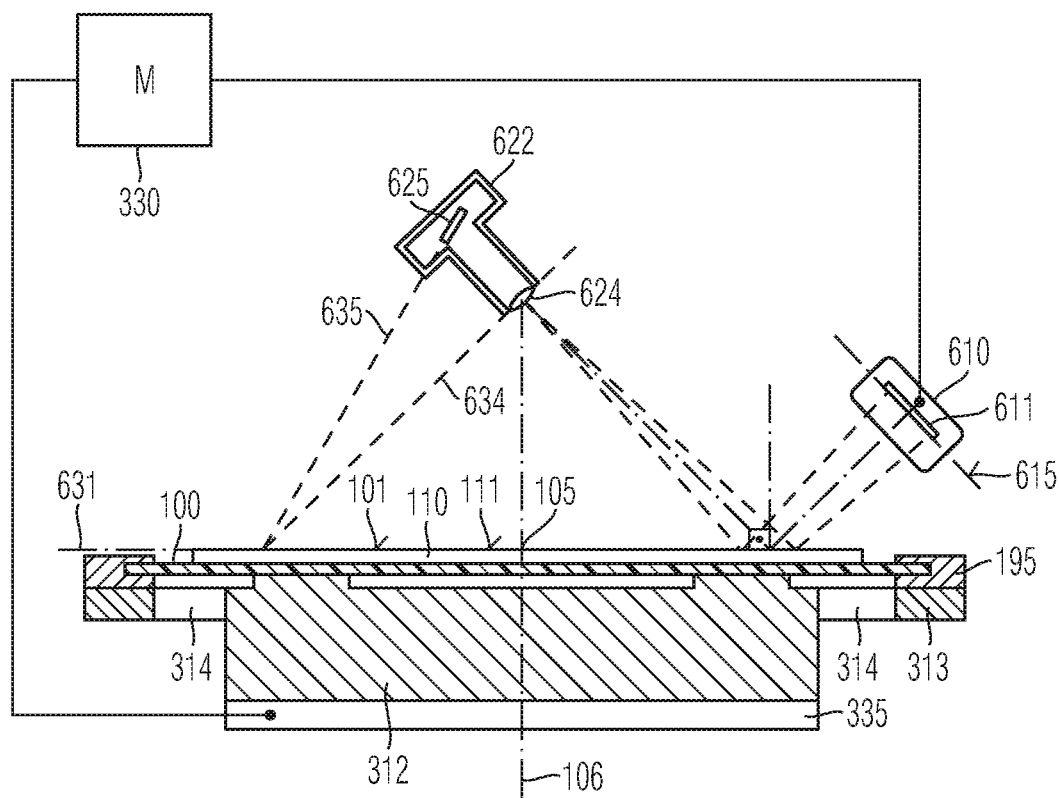
FIG. 17A shows a vertical cross-section of a schematically illustrated deflectometry apparatus according to an embodiment with a lens of the detection device arranged above the center point of the DUT.
Figure 17B:
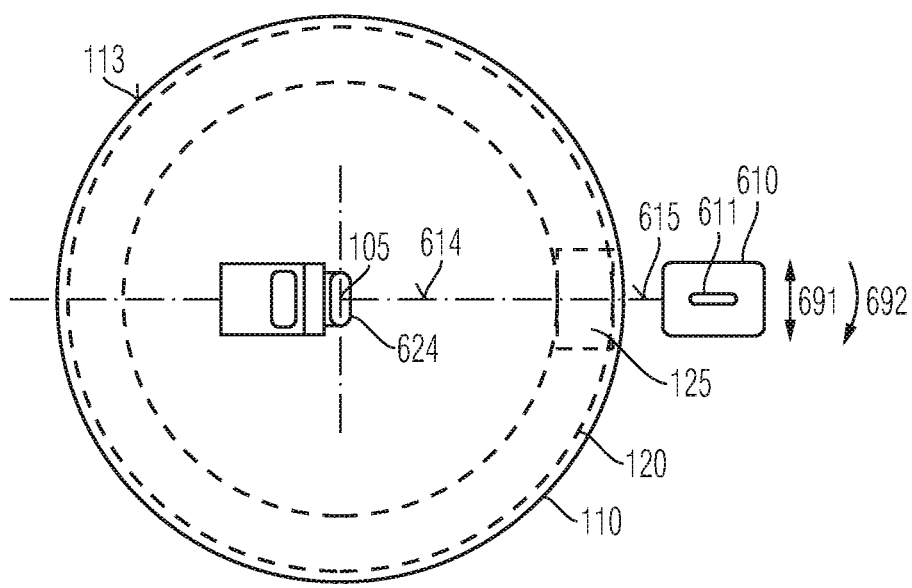
FIG. 17B is a simplified plan view of a DUT inspected with the deflectometry apparatus of FIG. 17A.

FIGS. 17A and 17B illustrate a deflectometry apparatus 600 with the center of a lens 624 of the detection device 622 arranged in a line orthogonal to the object plane 631 and through the center point 105 of the DUT 100. In addition, one of the Scheimpflug and Hinge rules may be fulfilled.

Figure 18:
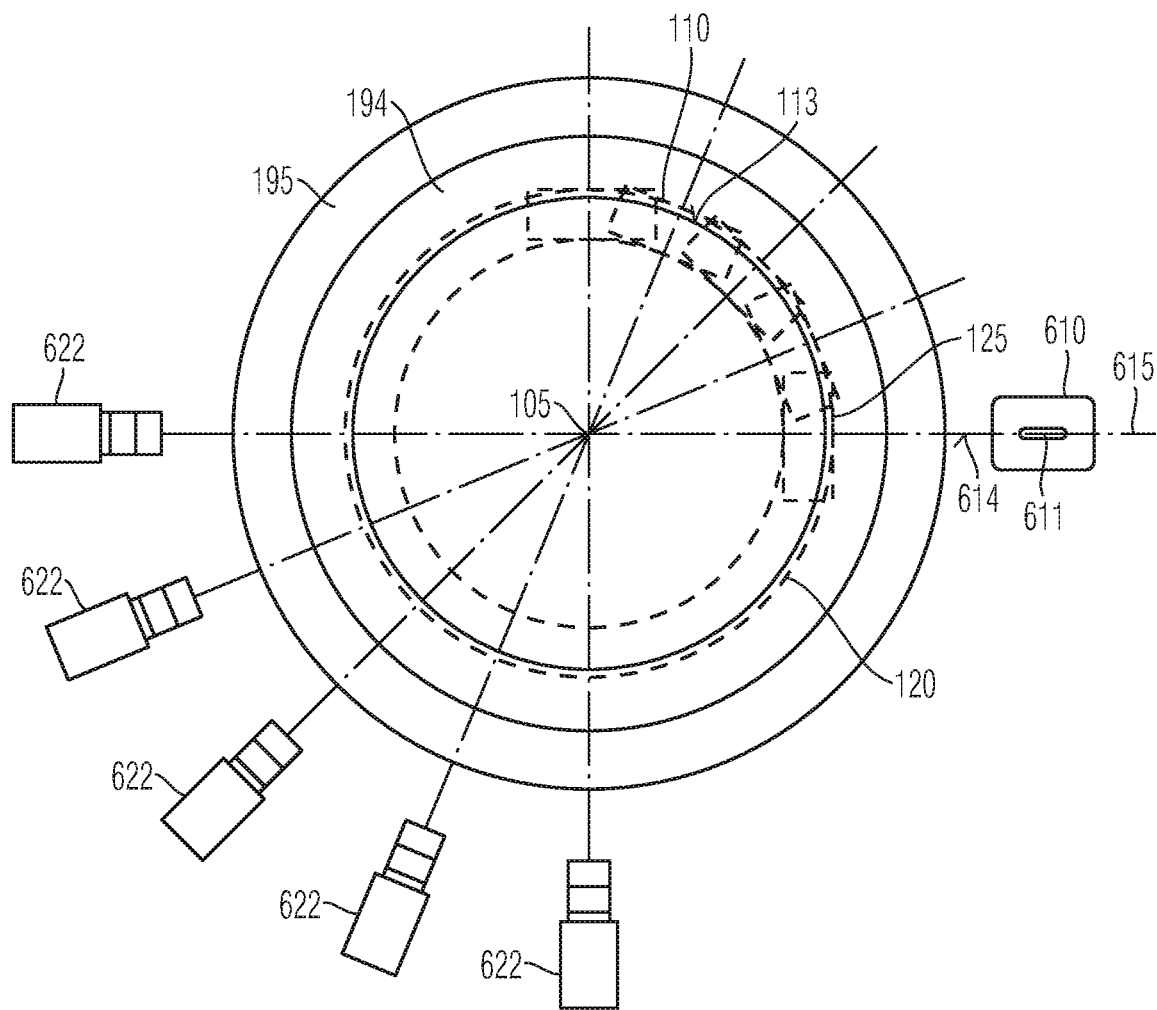
FIG. 18 shows a plan view of a DUT inspected with a schematically illustrated deflectometry apparatus according to an embodiment with a plurality of detection devices positioned around and radially to a center point of the DUT.

FIG. 18 refers to a deflectometry apparatus 600 including an array of detection devices 622 arranged at regular angular distances around the center point 105 of the DUT 100. The fields of view of the detection devices 622 may cover the complete annular inspection area 120. At least one light emitting line 611 is positioned in such a way that the a stripe reflection 612 of the light emitting line 611 that is reflected in the annular inspection area 120 is approximately oriented in radial direction to the annular inspection area 120.

The array of detection devices 622 may be functionally coupled to the support device that may be integrated in a rotation chuck. The functional coupling may be a rigid mechanical connection, may include a gear and shaft assembly, or may include another rotation stage that rotates synchronized to the rotation chuck.

During image acquisition the DUT and the array of detection devices 622 may rotate around the center point 105 whereas the at least one light emitting line 611 does not move. Only such detection devices 622, in which direction the light emitting line 611 reflects on the DUT surface 101, capture images. All images can be captured during one steady rotational motion without stops at discrete angular positions.

According to a further embodiment two or more light emitting lines 611 are positioned in radial symmetry with respect to each other, i.e., at equal angular distances.

Figure 19A:
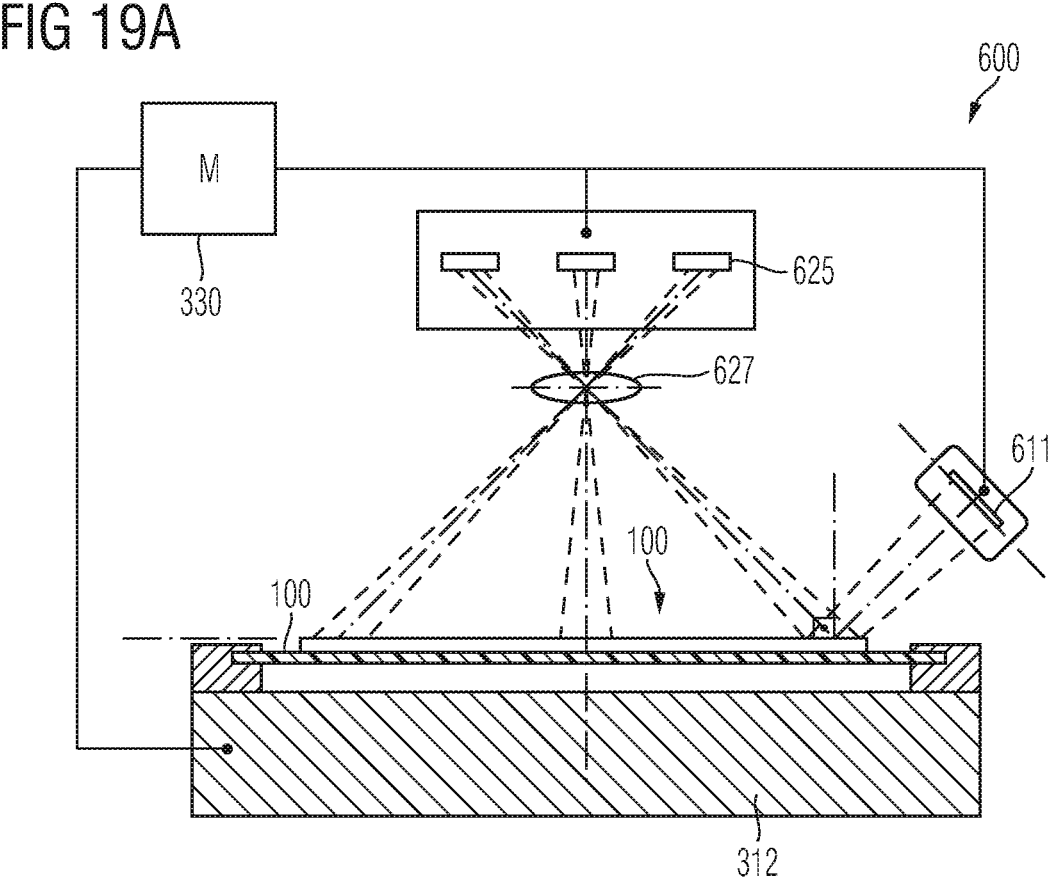
FIG. 19A shows a vertical cross-section of a schematically illustrated deflectometry apparatus according to an embodiment with a central lens and a plurality of image sensor units.
Figure 19B:
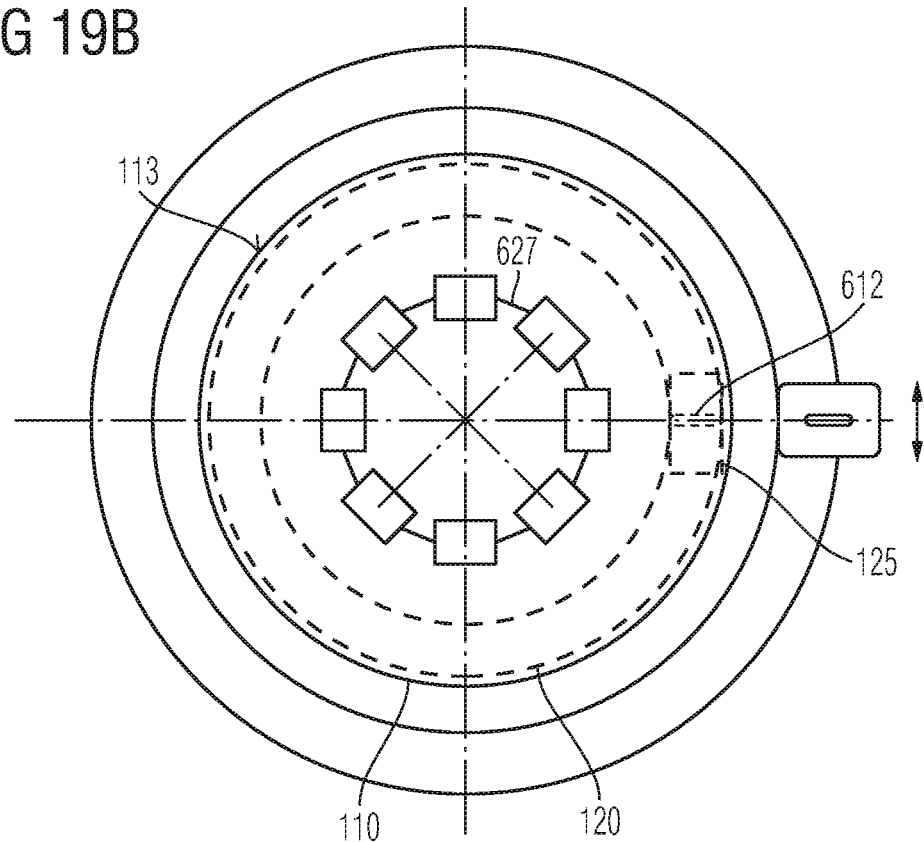
FIG. 19B is a simplified plan view of a DUT inspected with the deflectometry apparatus of FIG. 19A.

FIGS. 19A and 19B refer to a deflectometry apparatus 600 including a central lens 627 with a comparatively large image circle positioned with its center above the center point 105 of the DUT 100. At least one image sensor unit 625, which may be mounted on a sensor board or in a camera, is arranged in the image plane of the central lens 627. According to an embodiment a plurality of image sensor units 625 form a sensor array in such a way that the sensor array images all inspection fields forming the annular inspection area 120.

For example, the image sensor units 625 may be arranged along an annular area in the image plane of the central lens 627 in such a way that the image sensor units 625 image as much as possible of the annular inspection area 120 in the object plane. The sensor array is functionally coupled to the support device 312 that may be integrated in a rotation chuck. The functional coupling may be a rigid mechanical connection, may include a gear and shaft assembly, or may include another rotation stage that rotates synchronized to the rotation chuck.

In addition the sensor array may be rotated with respect to the support device 312 such that at the second angular position of the sensor array the image sensor units 625 are positioned in the gaps between the image sensor units 625 at the first angular position of the sensor array. For example, the sensor array may be rotated by an angle half the angular distance between neighboring image sensor units.

The central lens 627 can be mechanically connected to the sensor array and may rotate together with the sensor array or it can be steady-mounted. The light emitting line 611 is positioned in such a way that the a stripe reflection 612 of the light emitting line 611 that is reflected in the annular inspection area 120 is approximately oriented in radial direction to the annular inspection area 120.

The total image acquisition time for the whole annular inspection area 120 can be reduced by parallelization. According to a further embodiment additional light emitting lines 611 can be positioned in radial symmetry with respect to the light emitting line 611, i.e., at equal angular distances to each other.

According to another embodiment the light emitting line(s) 611 may be moveable whereas the sensor array and the central lens 627 with the large image circle are steady-mounted.

Figure 20A:
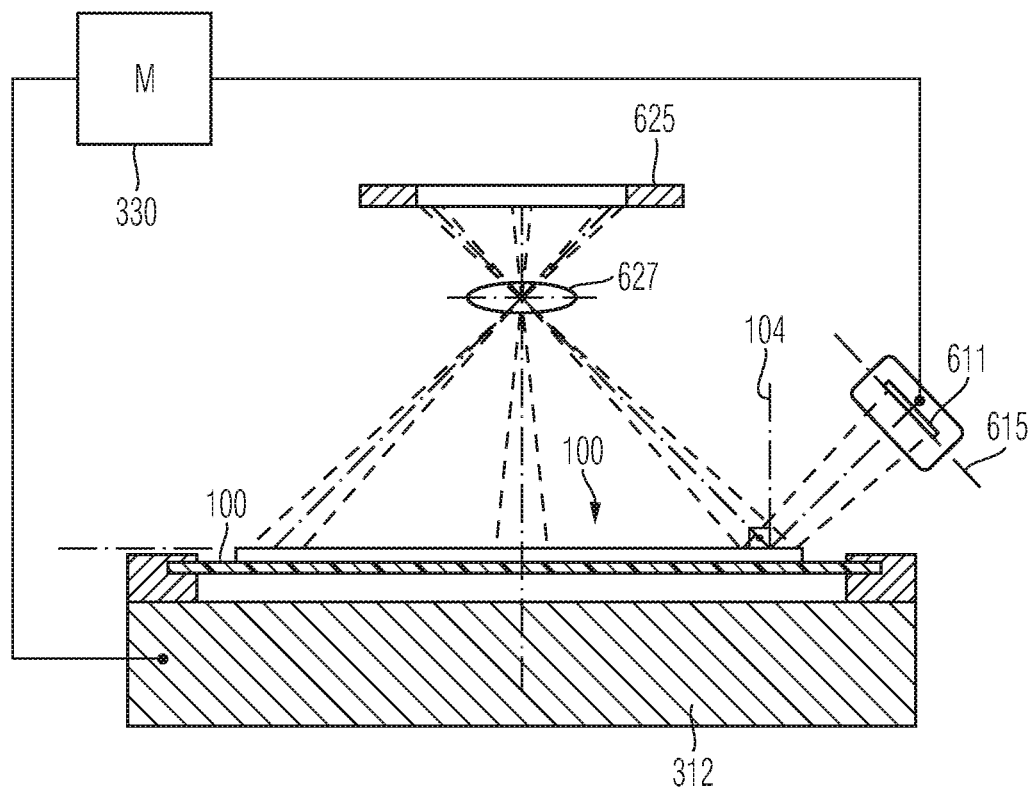
FIG. 20A shows a vertical cross-section of a schematically illustrated deflectometry apparatus according to an embodiment with a central lens and an annular image sensor unit.
Figure 20B:
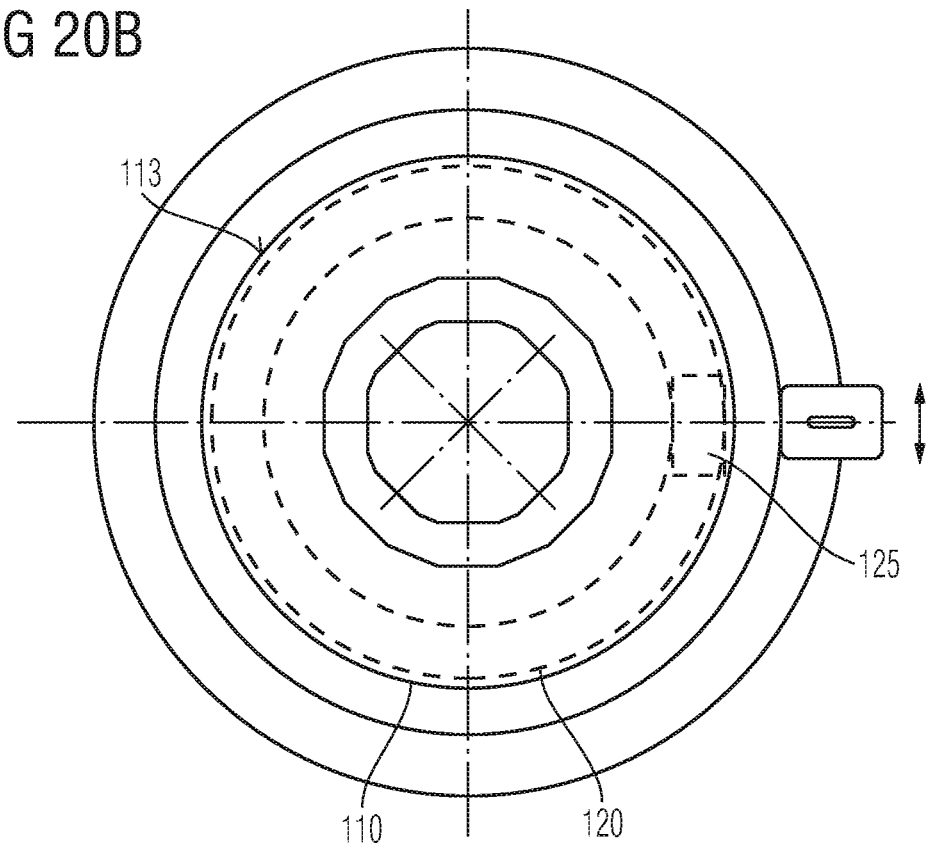
FIG. 20B is a simplified plan view of a DUT inspected with the deflectometry apparatus of FIG. 20A.

FIGS. 20A and 20B refer to an embodiment with a large image sensor or an annular image sensor unit 625 replacing the sensor array of FIGS. 19A and 19B.

The deflectometry apparatuses 600 illustrated in FIGS. 10A to 20B may include an auxiliary inspection device as illustrated in FIG. 7C. The mechanical rotation of the rotation chuck can be used for providing the scanning motion for further scanning based sensors, e.g., laser triangulation sensors, light sheet sensors, line scan cameras, chromatic white light sensors, or photometric stereo sensors.

Figure 21A:
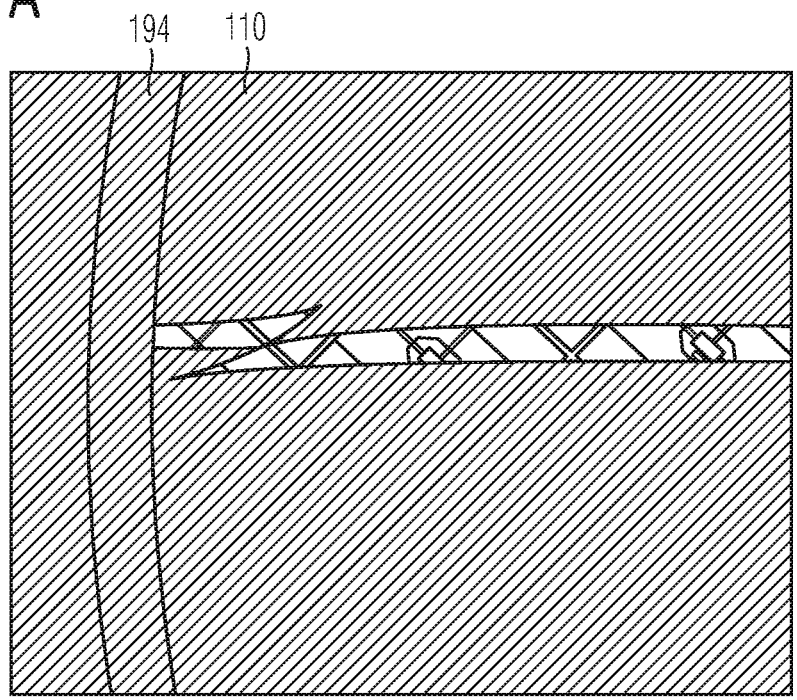
FIG. 21A shows an image captured at a reflection of a light emitting line in the region of a hairline crack for discussing background useful for understanding of the embodiments.
Figure 21B:
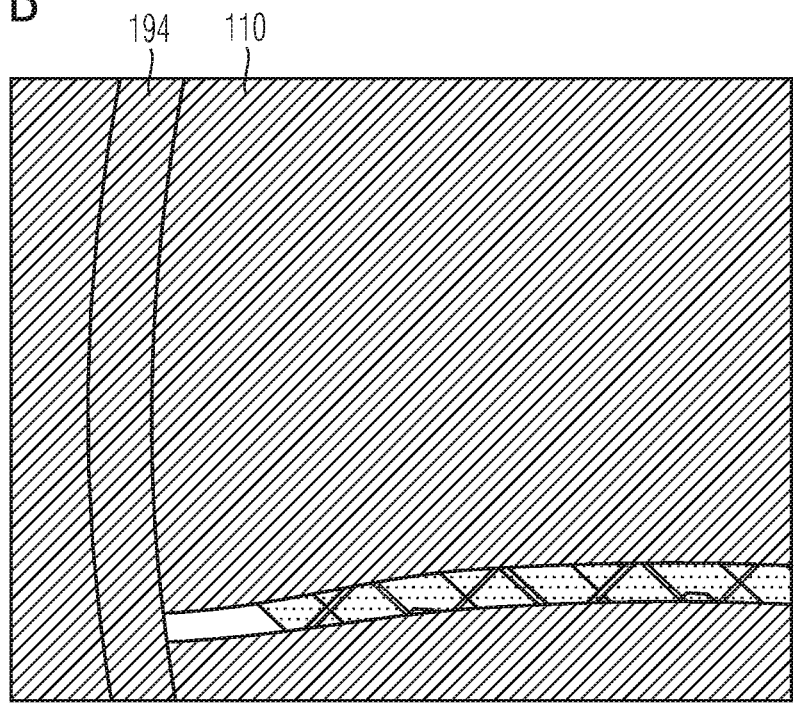
FIG. 21B shows an image captured at a reflection of a light emitting line in the region of a scratch for discussing background useful for understanding of the embodiments.

FIGS. 21A and 21B schematically show two single images from the image sequence that has been used to compute the bright field image and the slope image.

FIG. 21A refers to the image where the light emitting line is reflected at the location of the hairline crack.

FIG. 21B refers to the image where the light emitting line is reflected at the location of a scratch.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. An inspection method for semiconductor substrates, the method comprising:
   recording, by using an inspection apparatus, first data from measuring points in an inspection area of a main surface of a semiconductor substrate, wherein the inspection area winds around a center point of the main surface and wherein the first data includes information about a slope of the main surface at the measuring points along a first direction that deviates from a direction tangential to a circle that contains the respective measuring point and that has its center in the center point by not more than ±60°;
   analyzing, by a data processing apparatus, the first data to obtain position data of locations on the main surface at which the first data fulfills predetermined criteria; and
   outputting the position data through a data interface unit.

2. The inspection method of claim 1, further comprising:
   obtaining, from the first data, second data descriptive of a change of the slope at the measuring points along the first direction as defined for the respective measuring point and wherein the position data identifies locations, at which a value of the change of slope exceeds a predetermined threshold.

3. The inspection method of claim 1, wherein the first data includes information about a slope of the main surface at the measuring points along the direction tangential to a circle that contains the measuring points and that has its center in the center point.

4. The inspection method of claim 1, wherein the first data includes a number n of data subsets and each data subset comprises, for measuring points in one of n inspection fields in the inspection area, information about a slope of the main surface at the measuring points in a direction orthogonal to one radial line to the center point and through the inspection field, with n denoting an integer number greater than 2.

5. The inspection method of claim 1, wherein recording the first data comprises recording topography data and converting the topography data into slope data, and wherein converting the topography data comprises a digital filtering method.

6. The inspection method of claim 1, wherein the inspection apparatus includes a deflectometry apparatus that comprises a radiation source configured to define a light emitting line and a detection device configured to receive a reflection of the light emitting line, and wherein the reflection comprises a stripe reflection approximately oriented in radial direction with respect to the center point.

7. The inspection method of claim 6, wherein the first data includes a number n of data subsets and each data subset comprises, for measuring points in one of n inspection fields of the inspection area, information about a slope of the main surface at the measuring points in a direction orthogonal to one radial line to the center point and through the inspection field, with n denoting an integer number greater than 2, and wherein for obtaining the data subset the light emitting line is moved such that the stripe reflection mainly moves along the direction orthogonal to the one radial line.

8. The inspection method of claim 1, wherein the semiconductor substrate is arranged on a first surface section of a carrier surface of a substrate carrier, wherein the inspection area extends beyond a lateral outer surface of the semiconductor substrate, wherein the first data comprises information about a slope of a second surface section of the carrier surface at the measuring points, and wherein the second surface section laterally adjoins the semiconductor substrate.

9. The inspection method of claim 1, further comprising: recording auxiliary data obtained from radiation emitted by an auxiliary radiation source and reflected at or passing through the main surface, wherein analyzing the first data comprises analyzing the auxiliary data.

10. An inspection apparatus, comprising:
a support device comprising a wafer chuck that is configured to temporarily fix a DUT (device under test) comprising a semiconductor substrate against the wafer chuck;
a measuring device comprising a radiation sensor configured to record first data from measuring points in an inspection field of a DUT surface of the DUT using the radiation sensor, wherein the first data includes information about a slope of the DUT surface at the measuring points along a direction tangential to a circle that contains the respective measuring point and that has its center in a center point of the DUT;
a positioning device comprising a rotational motor drive that is mechanically connected to the support device and is configured to facilitate a rotational relative movement between the measuring device and the support device; and
a control device signal connected with the rotational motor drive of the positioning device and configured to control a relative movement between the measuring device and the support device such that the inspection field moves around the center point.

11. The inspection apparatus of claim 10, wherein the rotational motor drive is configured to rotate the support device around a rotational axis through the center point.

12. The inspection apparatus of claim 10, wherein the measuring device is configured to record topography data from the inspection field.

13. The inspection apparatus of claim 10, further comprising:
an auxiliary inspection device comprising an auxiliary radiation source and an auxiliary detection unit that is configured to detect intensity of radiation emitted by the auxiliary radiation source, wherein the auxiliary inspection device is configured to record intensity of the radiation emitted by the auxiliary radiation source and reflected at or passing through the DUT surface of the DUT.

14. An inspection system for semiconductor substrates, comprising:
the inspection apparatus of claim 10;
a data processing apparatus including an integrated circuit that is configured to analyze the first data obtained by the inspection apparatus to obtain position data of locations on the DUT surface, at which the first data fulfills predetermined criteria; and
a data interface unit comprising a visual user interface and configured to output the position data via the visual user interface.

15. A deflectometry apparatus, comprising:
a radiation source configured to define a light emitting line;
a detection assembly comprising a support device that comprises a wafer chuck, the support device configured to temporarily fix a DUT (device under test) that comprises a semiconductor substrate against the wafer chuck, and a detection device configured to detect radiation emitted by the radiation source and reflected at a DUT surface of the DUT; and
a positioning device comprising a rotational motor drive that rotates the support device around a center point, wherein the positioning device is mechanically coupled to at least one of the radiation source and the detection assembly, and configured to cause a relative movement between the light emitting line and the detection assembly.

16. The deflectometry apparatus of claim 15, wherein the detection assembly and the radiation source are arranged such that the detection device receives a stripe reflection of the light emitting line reflected from the DUT surface in the inspection field and mainly oriented in a radial direction with respect to a center point of the DUT surface.

17. The deflectometry apparatus of claim 16, wherein the positioning device is configured to facilitate a movement of the stripe reflection through the inspection field in a direction mainly orthogonal to the radial direction.

18. An inspection apparatus, comprising:
the deflectometry apparatus of claim 15; and
a control device signal connected with the positioning device and configured to control a relative movement between the support device at one side and the light emitting line and the detection device at another side such that the inspection field is guidable along a track around the center point.

19. The inspection apparatus of claim 18, wherein the deflectometry apparatus is arranged such that the inspection field extends beyond a lateral outer surface of the semiconductor substrate.

20. An inspection system for semiconductor substrates, comprising:
the inspection apparatus of claim 18;
a data processing apparatus including an integrated circuit that is configured to process the first data obtained by the inspection apparatus to obtain position data of locations on the DUT surface at which the first data fulfills predetermined criteria; and
a data interface unit configured to output the position data.

21. The deflectometry apparatus of claim 15, wherein the detection device comprises an image sensor unit, and wherein detection device is configured to detect the radiation emitted by the radiation source with the image sensor unit and the radiation source each disposed above the DUT surface of the DUT.

22. The deflectometry apparatus of claim 21, wherein the image sensor unit and the radiation source are laterally offset from one another in a direction that is parallel to a surface of the wafer chuck that interfaces with the DUT.

* * * * *